United States Patent [19]

Runge

[11] Patent Number: 4,898,280
[45] Date of Patent: Feb. 6, 1990

[54] RECLOSABLE BAG

[75] Inventor: Heinz F. Runge, Niles, Ill.

[73] Assignee: Kraft, Inc., Glenview, Ill.

[21] Appl. No.: 317,447

[22] Filed: Mar. 1, 1989

Related U.S. Application Data

[62] Division of Ser. No. 186,886, Apr. 27, 1988.

[51] Int. Cl.$^4$ .............................................. B65D 33/30
[52] U.S. Cl. ...................................... 206/604; 383/61; 383/89; 383/905
[58] Field of Search ................ 383/61, 89, 905; 206/604

[56] References Cited

U.S. PATENT DOCUMENTS

| | | |
|---|---|---|
| 448,783 | 12/1892 | Weber . |
| 497,037 | 5/1893 | Vawter . |
| 1,210,699 | 1/1917 | Roy . |
| 1,665,576 | 4/1928 | Witham . |
| 2,093,976 | 9/1937 | Farmer ............................ 229/62 |
| 2,189,174 | 2/1940 | Hohl ............................... 229/52 |
| 2,285,447 | 6/1942 | Lichter ............................. 154/1 |
| 2,635,788 | 4/1953 | Snyder et al. ................. 222/107 |
| 2,792,168 | 5/1957 | Garcon ........................... 229/65 |
| 2,973,131 | 2/1961 | Mead et al. .................... 229/66 |
| 3,134,680 | 5/1964 | Daline ............................. 99/171 |
| 3,164,695 | 1/1965 | Sanni .............................. 206/56 |
| 3,189,253 | 6/1965 | Mojonnier ...................... 229/66 |
| 3,201,030 | 8/1965 | Pollack ........................... 229/65 |
| 3,542,190 | 11/1970 | Keller ............................. 206/46 |
| 3,545,668 | 12/1970 | Hultberg ......................... 229/65 |
| 3,618,850 | 11/1971 | Balmer ........................... 229/62 |
| 3,625,351 | 12/1971 | Eisenberg ....................... 206/56 |
| 3,688,973 | 9/1972 | Lillkvist ......................... 229/54 |
| 3,799,914 | 3/1974 | Schmit et al. ................... 426/85 |
| 3,859,895 | 1/1975 | White ............................. 93/35 |
| 3,889,871 | 6/1975 | White ............................. 229/65 |
| 4,117,934 | 10/1978 | Mowli et al. ................... 206/610 |
| 4,126,085 | 11/1978 | Mowli et al. ................... 93/35 |
| 4,356,954 | 11/1982 | Mojonnier ...................... 229/65 |
| 4,593,408 | 6/1986 | Drobish et al. ................. 383/43 |
| 4,603,537 | 8/1986 | Pace ................................ 53/415 |
| 4,679,701 | 7/1987 | Ackermann et al. ........... 220/404 |
| 4,686,814 | 8/1987 | Yanase ............................ 53/459 |
| 4,765,117 | 8/1988 | Akutsu et al. .................. 53/133 |
| 4,765,118 | 8/1988 | Akutsu et al. .................. 53/133 |

*Primary Examiner*—Stephen P. Garbe
*Attorney, Agent, or Firm*—Fitch, Even, Tabin & Flannery

[57] ABSTRACT

A reclosable bag having an open end with a side margin adjacent the open end, a metal segment in the side margin having ends extending beyond the opening and a sealing tape overlying the metal strip for excapsulation thereof. Apparatus for manufacturing reclosable bags includes a continuous webbing of flexible bags joined end-to-end, a continuous roll of metal strip with an arrangement for forming the metal strip into discrete segments. A roll of adhesively coated sealing tape and an arrangement for positioning the sealing tape over a metal strip segment while applying the sealing tape to one end of a flexible bag. A method of forming the reclosable bags includes the steps of providing a serial succession of bags joined end-to-end, stretching a portion of each bag so as to be free of wrinkles, aligning a metal strip segment with the wrinkle-free portion of the bag and sealing the metal strip segment of the bag with a portion of sealing tape.

2 Claims, 11 Drawing Sheets

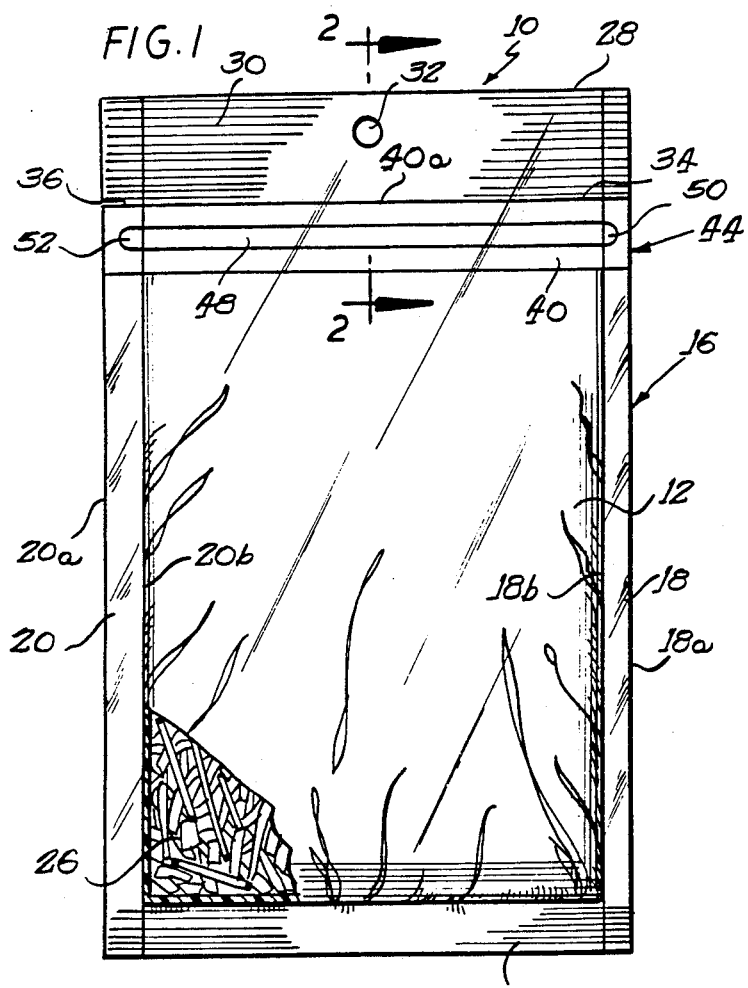
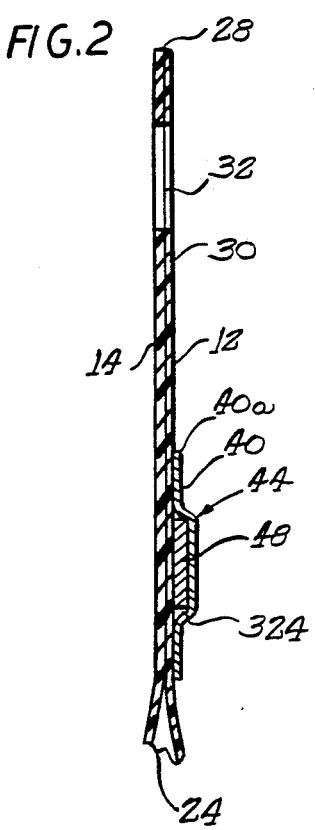
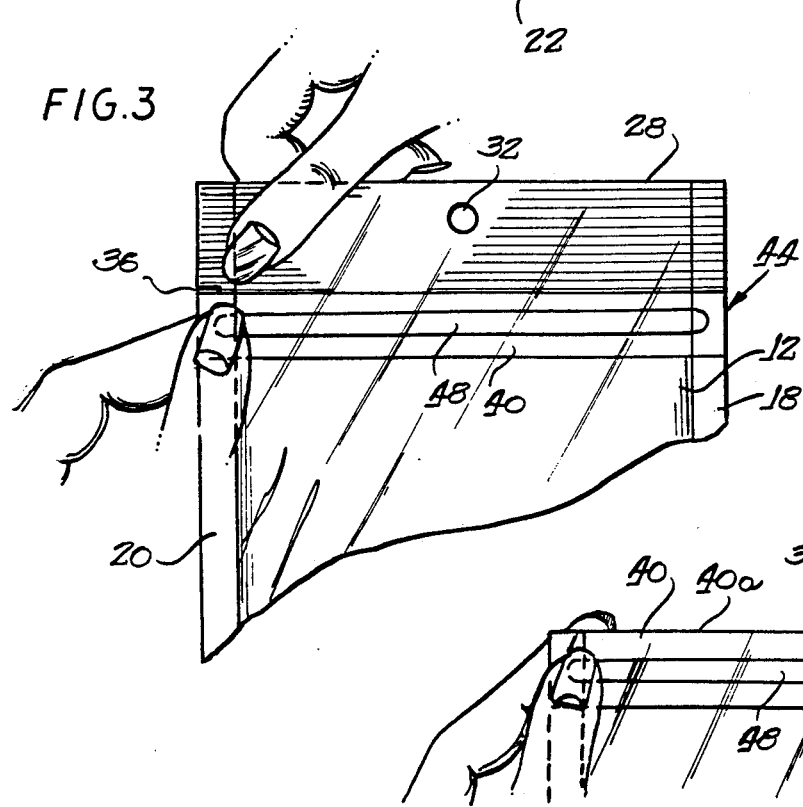
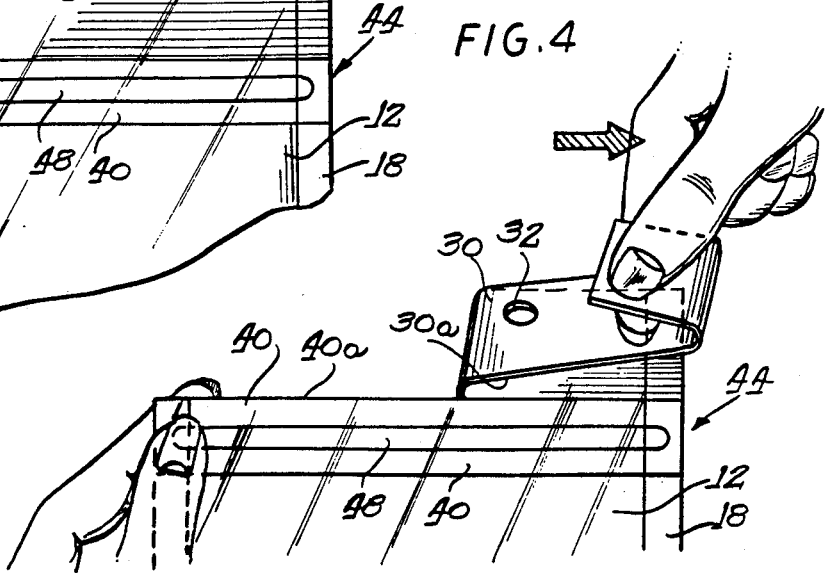

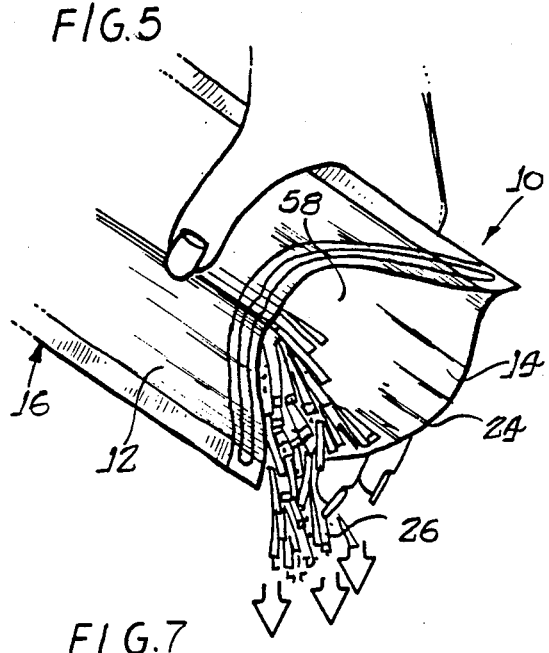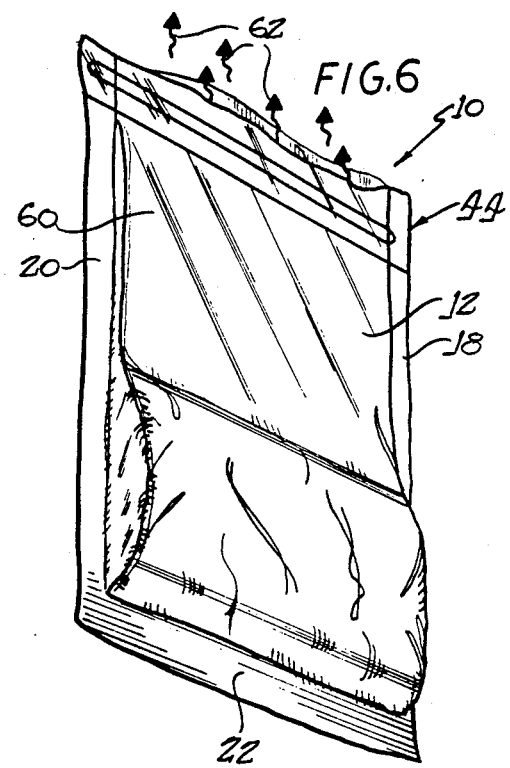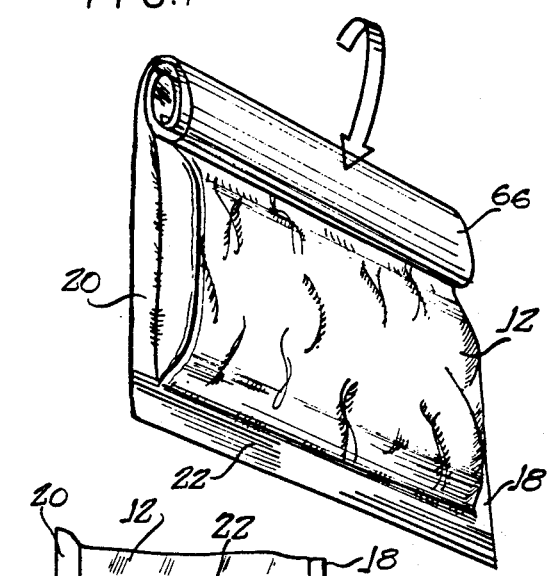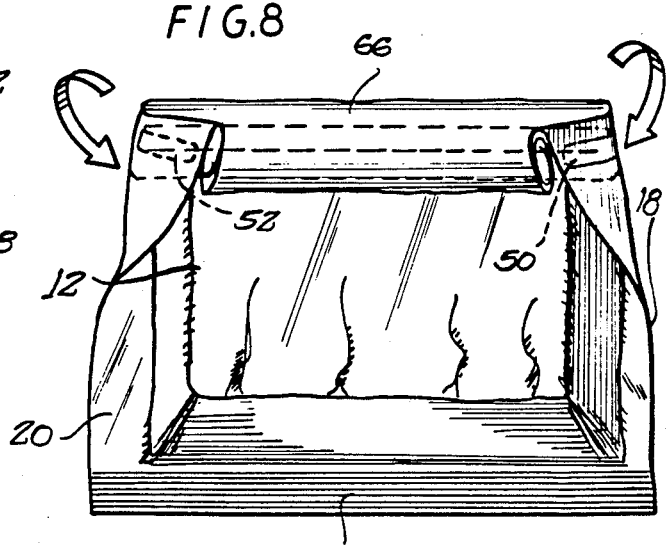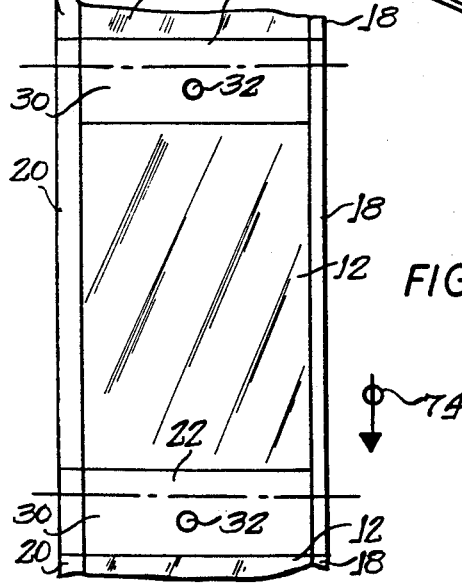

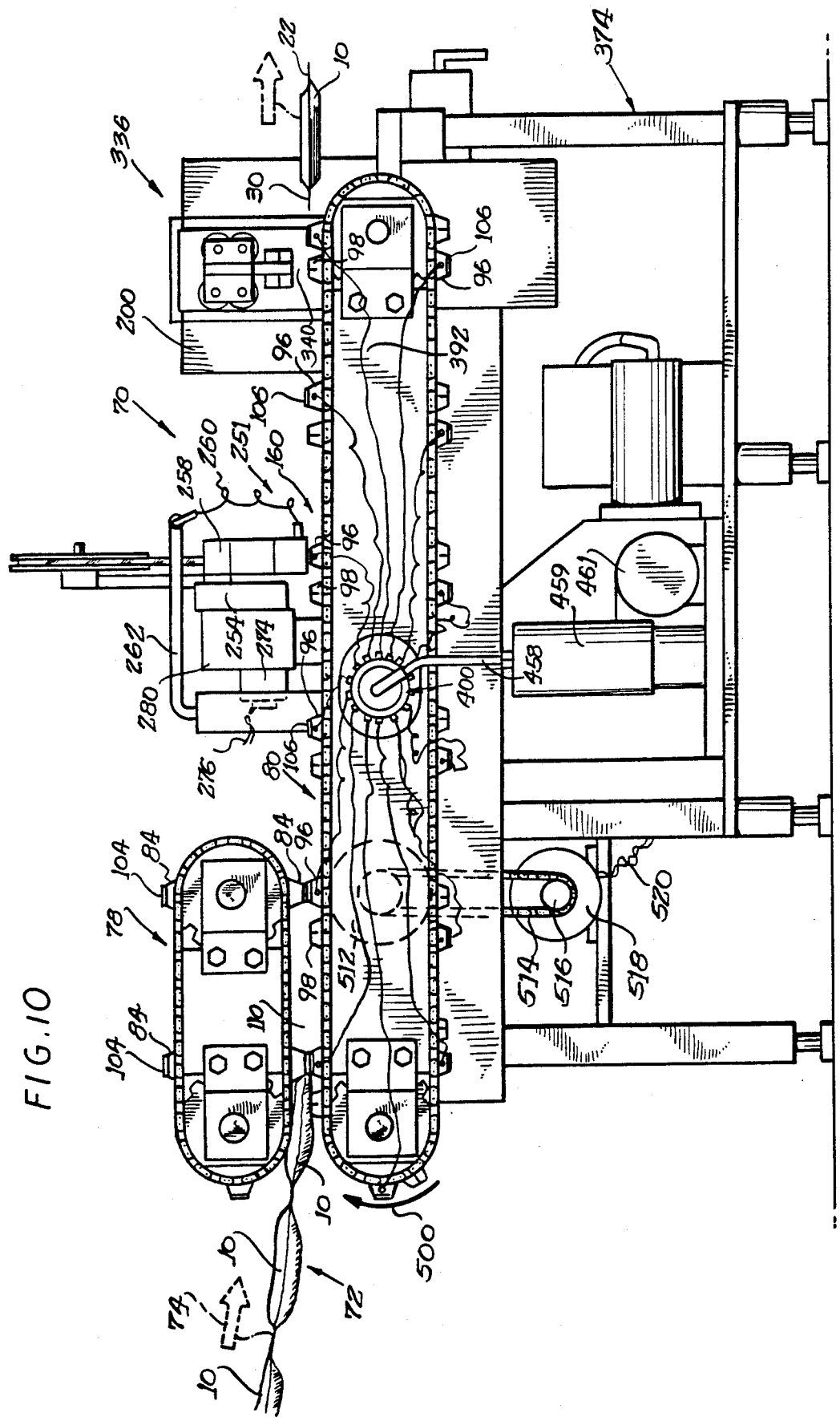

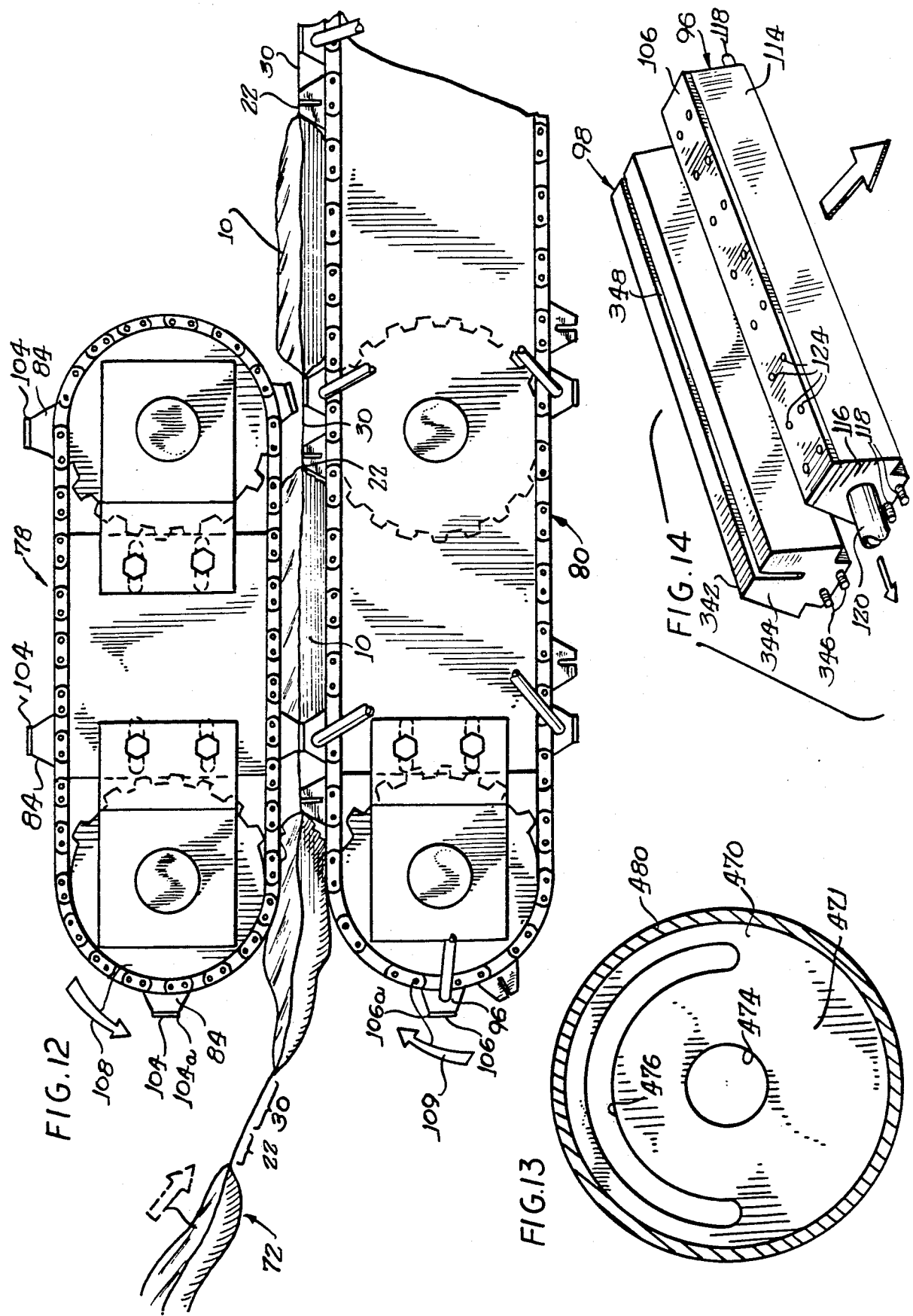

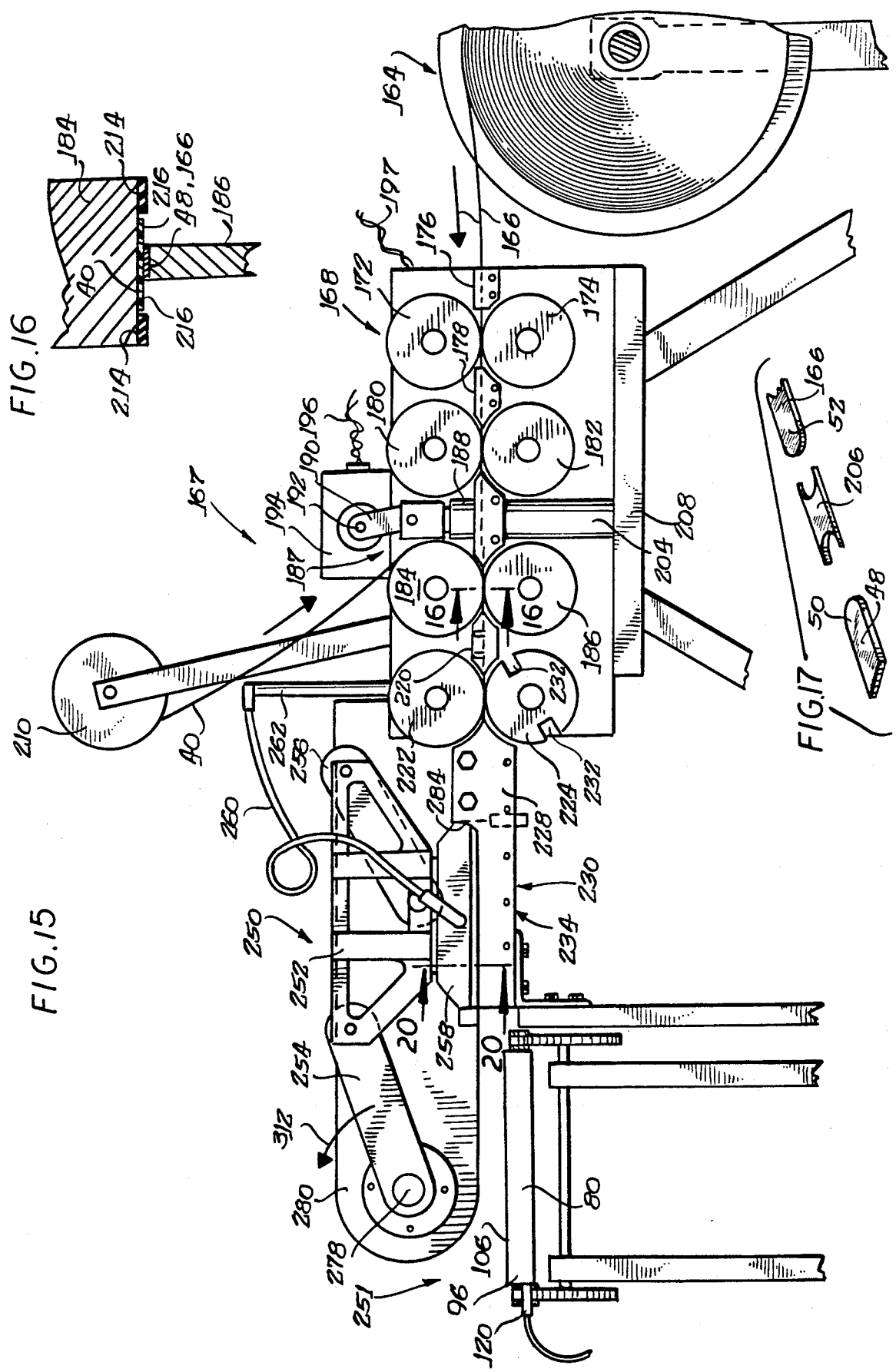

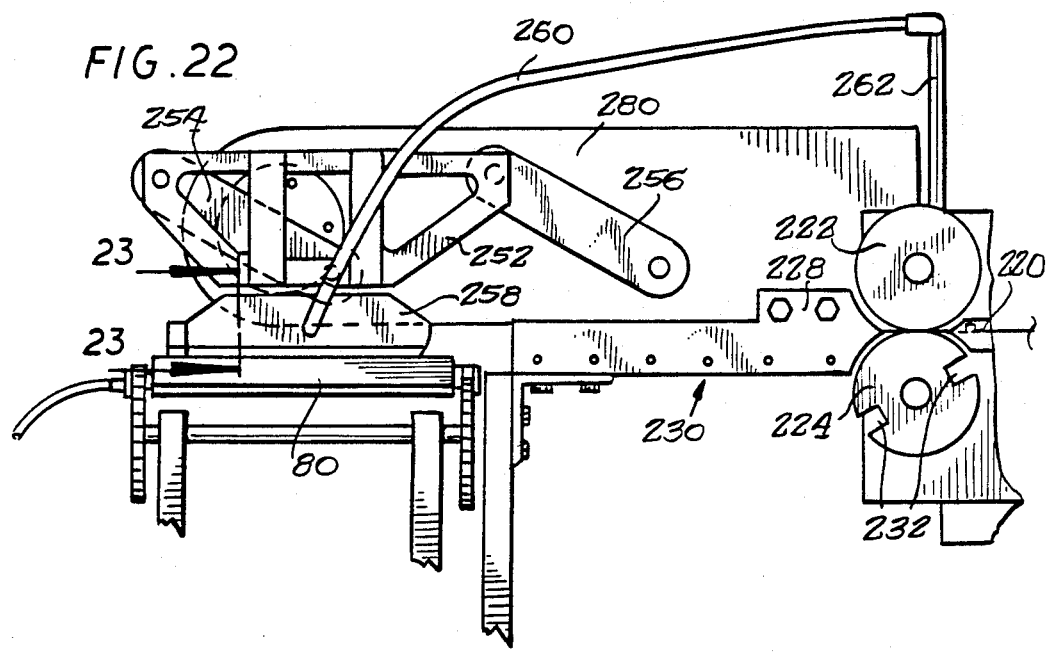
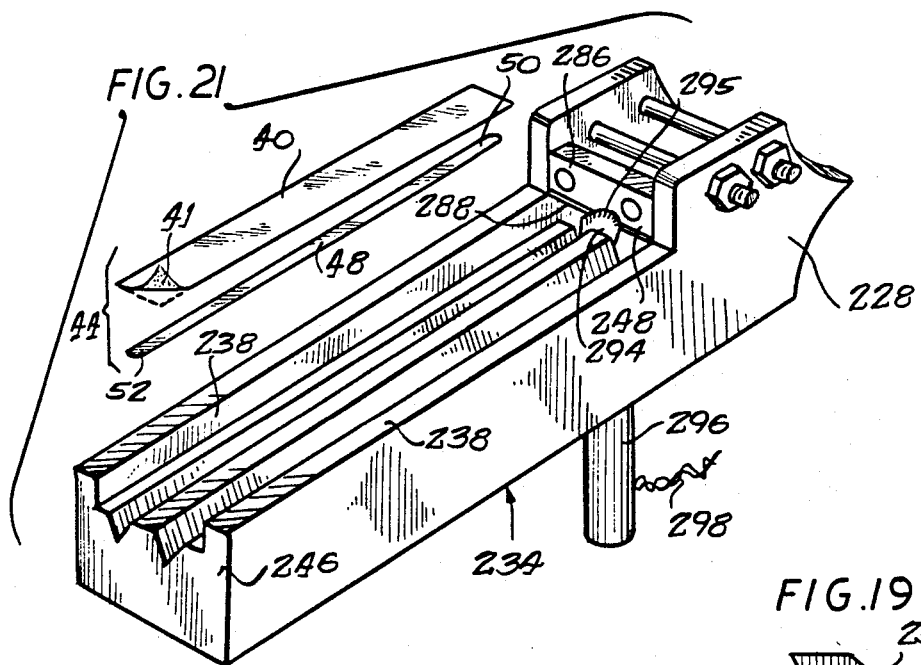
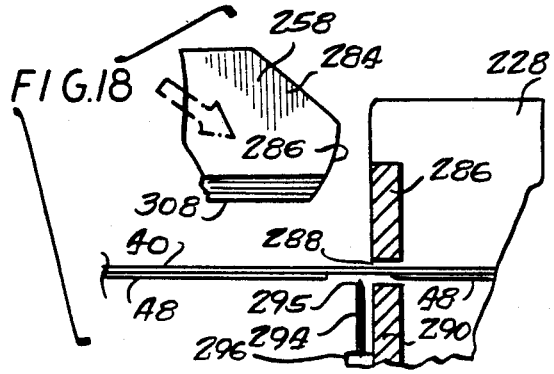
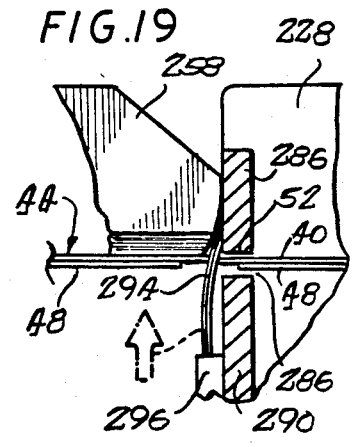

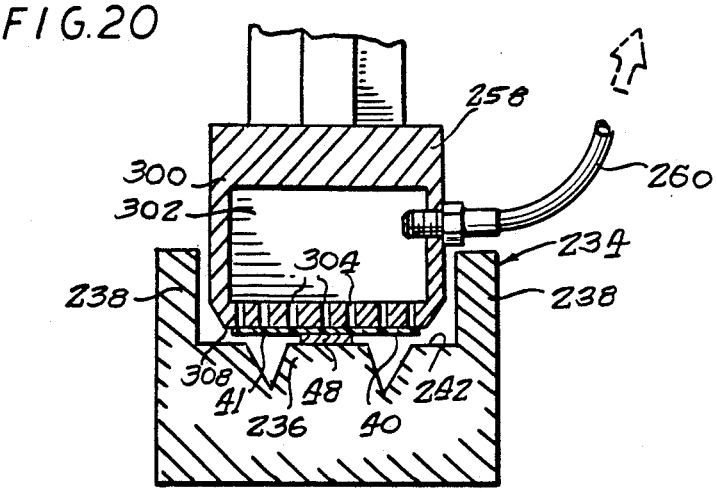
FIG.20
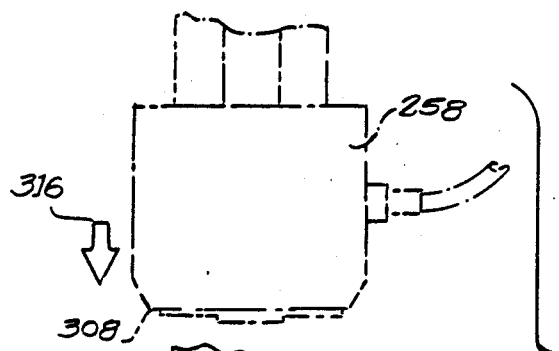
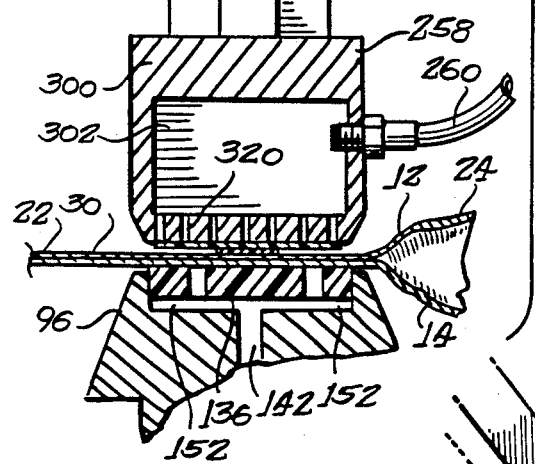
FIG.23
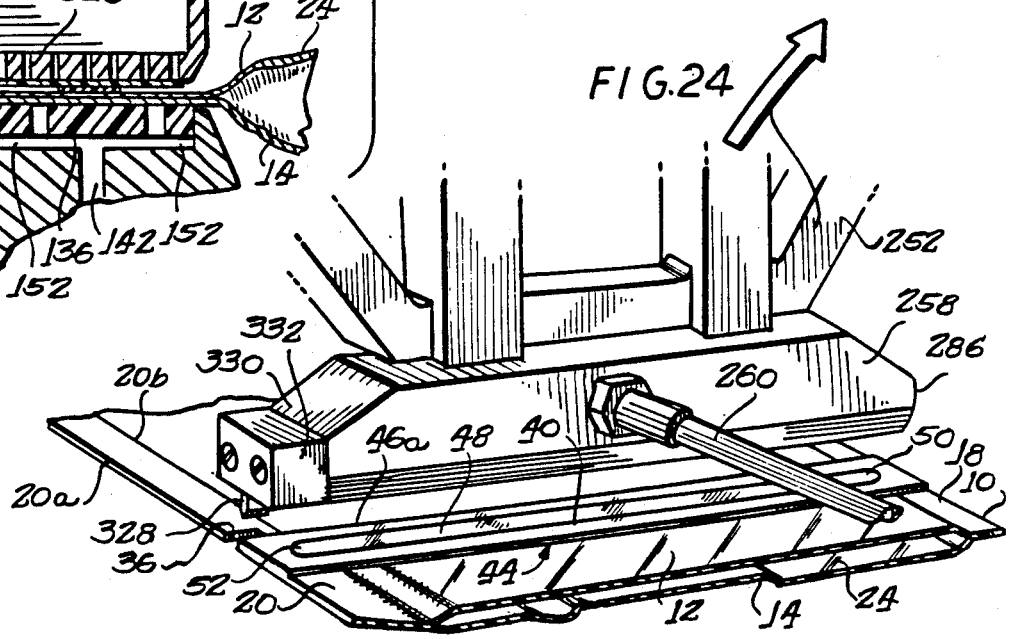
FIG.24

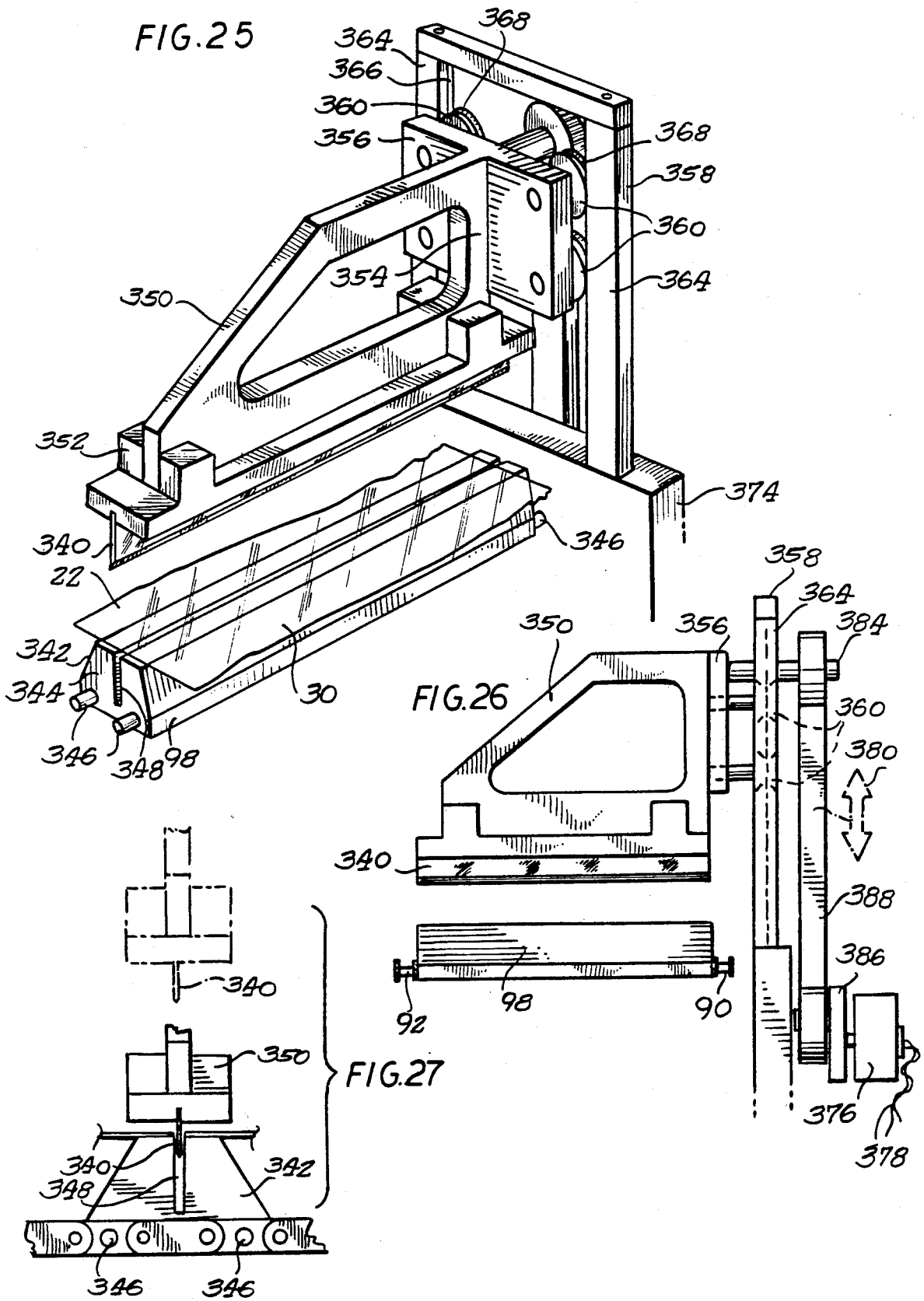

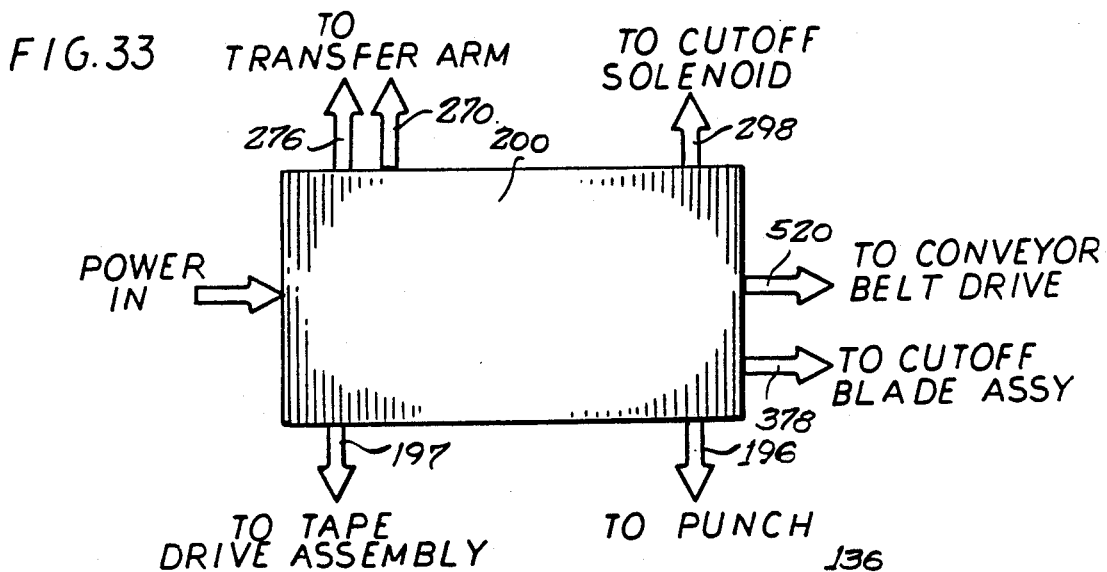
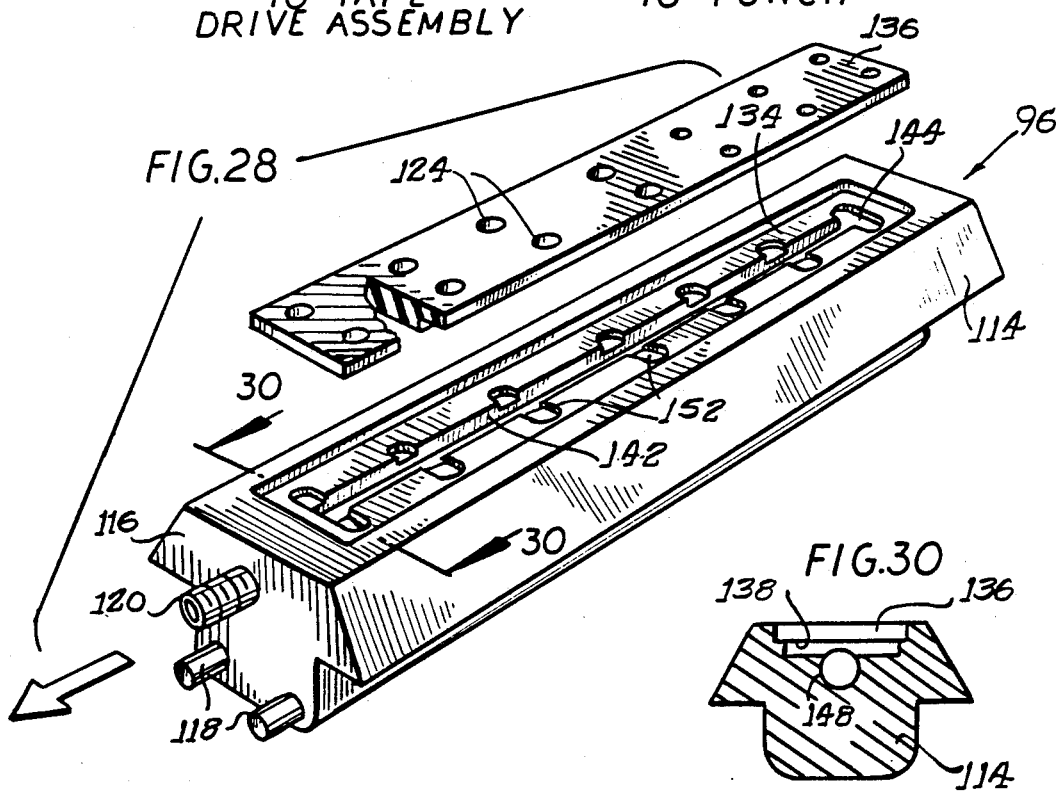
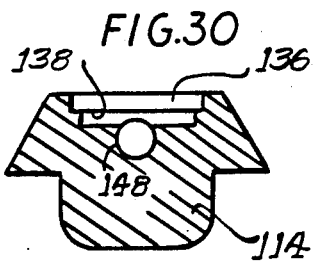
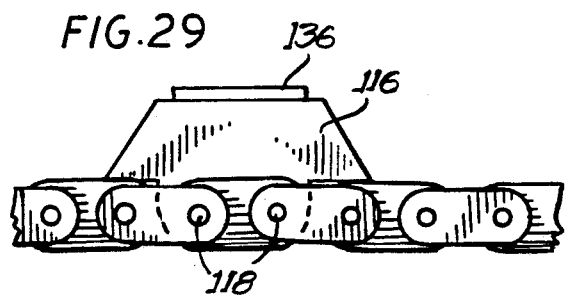

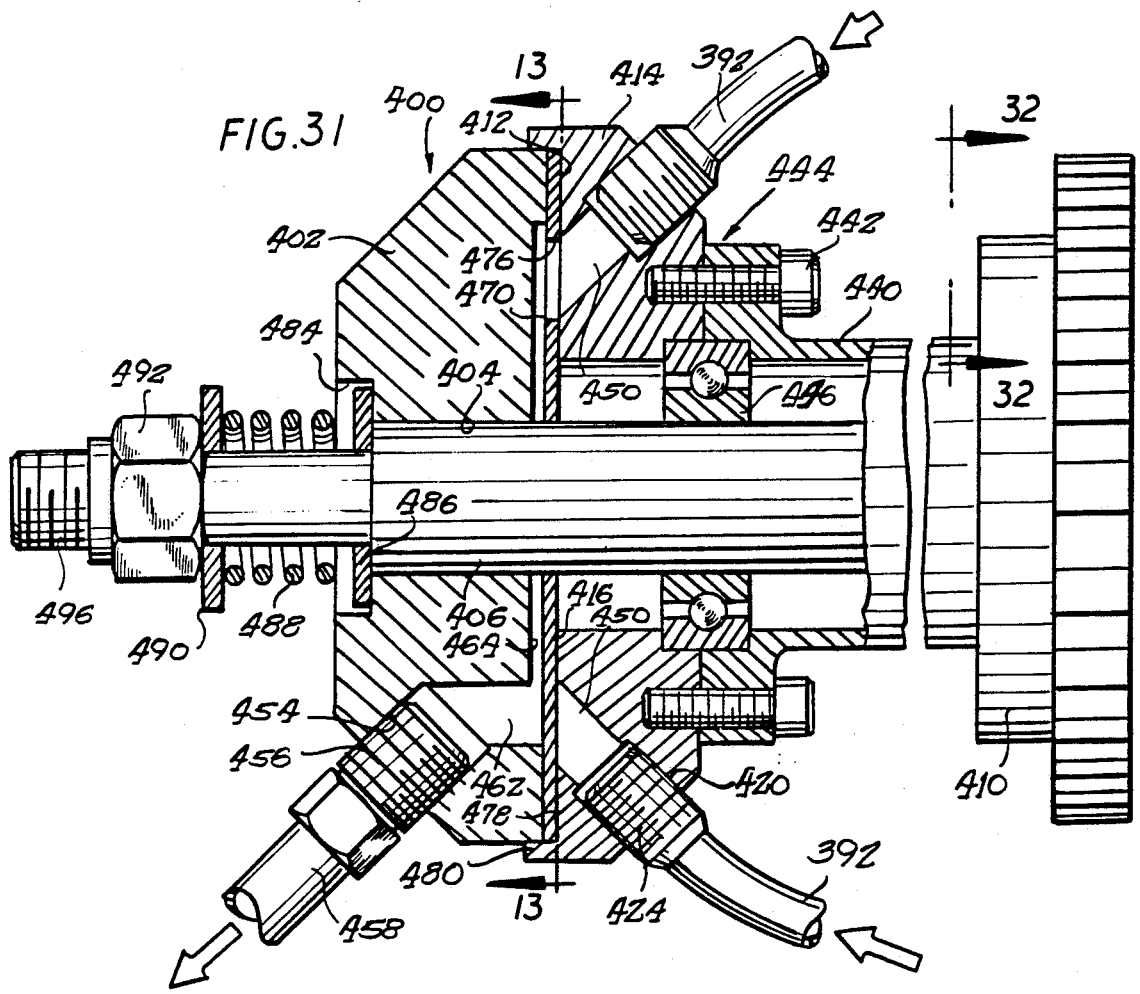
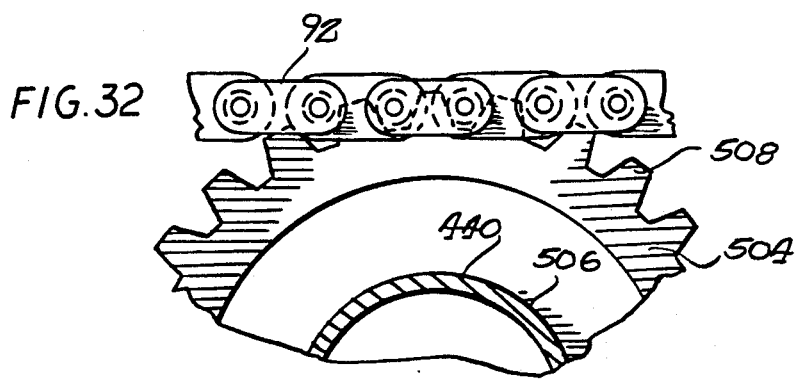

RECLOSABLE BAG

This is a division, of application Ser. No. 186,886, filed Apr. 27, 1988.

BACKGROUND OF THE INVENTION

1. Field of the Invention

The present invention pertains to reclosable bags, including apparatus and methods for the manufacture thereof, and in particular to flexible bags having an open end with a metal strip on the bag adjacent the open end which, upon rolling the open end of the bag, is folded over to maintain a rolled closure thereof.

2. Description of the Prior Art

Over the years, many products have been packaged in flexible containers having releasable or resealable openings. Such closures are particularly popular for bulk-packaged items where the entire contents of the package are usually not consumed immediately upon the opening thereof. The following U.S. Pat. Nos. for example, disclose paper bags or envelopes having bendable metal tabs adjacent their open end to provide a closure: 488,783; 497,037; 1,210,699; 1,665,576; 2,093,976; 2,189,174; 2,635,788; 2,792,168; 2,973,131; 3,189,253; 4,593,408; and 4,679,701. Of these, some reclosable bags are directed to containers for food products.

For example, U.S. Pat. No. 2,635,788 is directed to a pouch for peanut butter having a bendable metal closure located adjacent a line of weakness whereat the bag may be torn open to gain access to the contents thereof. U.S. Pat. Nos. 2,973,131 and 3,189,253 are directed to bags of the tin-tie type for holding milk samples preparatory to making laboratory tests of the milk. The tin-tie closure members extend beyond the lateral sides of the bag to assist in grasping the bag and opening the metal closures which overlie both major sidewalls of the pouch and which have to be pried apart in order to gain access to the contents.

U.S. Pat. No. 4,593,408 is directed to a flexible package having a transversely extended opening to which a metal band is applied coextensive with the opening. The metal band is secured to one of the major surfaces of the pouch. A fold line extending along the longitudinal axis of the metal segment allows the metal segment to be bent over on itself to provide a releasable closure.

In addition to the above patents, U.S. Pat. No. 3,201,030 provides a different type of releasable closure wherein a plurality of wires are located in one wall of a bread container, extending along the longitudinal axis thereof. The wires extend into a flap overlying one end of the bread container. In use, the flap of the bread container is rolled upon itself as bread within the container is removed and the container subsequently resealed. The wires in the panel of the bread container help maintain the rolled configuration of its end flap.

Although different types of bendable, resealable closures have been provided, the need for an improved resealable closure still exists. Many of the resealable closures of the above-listed patents were invented prior to the advent of mass production, and especially prior to the advent of automated mass production. The containers for many kinds of products sold today, for example, food products, must be manufactured bulk, loaded with the food product, and sealed using totally automated mass production techniques, if a commercial advantage is to be maintained. Many of the resealable closures of the above-listed patents are totally unsuitable for such automated mass production.

The closures for containing food products or for other use in the food industry must meet rigorous standards not present at the time many of the containers of the above-listed patents were made. For example, cracks, crevices, and the like, even if located on the outside of a food container, should be eliminated if at all possible, since cavities and recesses might develop where bacteria and the like can reside. Further, many of the bendable, resealable closures listed above have exposed metal components which are subject to corrosion and other contamination over time. Accordingly, it is important that containers having bendable metal strips, and especially such containers used in the food industry have the metal strips completely encapsulated or sealed.

A large-scale food processing plant frequently coordinates a number of very expensive machinery components to form a production line. Components within the production line should, ideally, be carefully matched one to another, since the production rate of the line is limited by the slowest machine component thereof. Frequently, the individual components within a production line are revamped or replaced by updated equipment, and it is desirable that a particular modified machine component be compatible with the old component in terms of physical size, flow path configuration, in order to accommodate the continuous succession of products. For example, an improved container fabrication and sealing component should be compatible with existing bulk loading components, such that the products can be loaded within individual containers with a minimum of modification to peripheral equipment and with a minimal disruption in the production schedule of the plant.

SUMMARY OF THE INVENTION

It is an object of the present invention to provide a bag formed of flexible sheet material with an open end through which the contents of the bag may be removed and having an arrangement for closing the open end of the bag to maintain a desired condition of the bag contents.

Another object of the present invention is to provide a reclosable bag of the above-described type which eliminates the need for zipper-like closures and which is inexpensive to manufacture and simple to operate.

Yet another object of the present invention is to provide a reclosable bag of the above-described type having a rolled closure in which the bag is squeezed, minimizing the air content thereof, and means for maintaining the closure in a rolled, closed condition.

Still another object of the present invention is to provide an apparatus for manufacturing reclosable bags, such as the reclosable bags of the above-described type.

Yet another object of the present invention is to provide a method of forming a continuous succession of reclosable bags.

These and other objects of the present invention are provided in a reclosable bag consisting of opposed walls having top and bottom edges extending between a pair of side edges. A marginal seal of preselected width joins the top, bottom and side edges of the walls to form a product-receiving cavity therebetween, the marginal seal having an inner edge adjacent the cavity and an outer free edge. A tear line extends along the walls between the side edges thereof, located adjacent the marginal seal of the top edge. Weakening means are provided in the marginal seal of at least one side edge extending from a free edge of the marginal seal and formed along an edge of the tear line. A metal strip segment on one sidewall has a top edge adjacent the tear line and a pair of opposed ends adjacent each side edge terminating between the inner and outer edge of the marginal seal located thereat. A strip of sealing tape cooperates with the one segment to encapsulate the metal strip segment and to orient the metal strip segment so that the top edge thereof lies along the tear line, so as to guide the tearing of the walls during opening of the reclosable bag. The opposing walls are flexible so as to be rollable about the metal strip segment. The metal strip segment is bendable so as to reclose the opening in the bag formed by tearing the walls along the tear line, upon rolling the walls about the metal strip segment.

Further objects of the present invention are provided in an apparatus for manufacturing a reclosable bag comprising means for supplying a plurality of flexible bags each having an enclosed interior, a lower closed end and an upper end at which an opening is formed therein through which access is gained to the interior of the bag, the bags being joined end-to-end to form a continuous webbing. Also included are:
- means for supplying metal strip segments having opposed trailing and leading ends;
- means for supplying sealing tape segments, each coated with an adhesive on one side thereof;
- means for aligning a metal strip segment with the upper end of one bag; and
- means for positioning a segment of sealing tape over the metal strip segment adjacent the upper end of the one bag so as to encapsulate the metal strip segment between the bag and the sealing tape segment and so as to seal the metal strip segment from corrosion.

Other objects of the present invention are attained in a method of providing a serial succession of bags each having individual closures, comprising the steps of:
- providing a chain of bags comprising a serial succession of bags joined end-to-end with an upper end of one bag joined to the lower end of an adjacent bag, the bags having a marginal border portions at the upper and lower ends,
- stretching a portion of a bag at a first upstream location so as to predetermined portions of the bags substantially free of wrinkles and surface disruptions;
- transporting the bag to a reclosure application station;
- providing a segment of a metal strip,
- providing a segment of a sealing tape having an adhesive coating on one side thereof and leading and trailing ends;
- aligning the metal strip segment with the bag; and
- sealing the metal strip segment to the bag with the segment of sealing tape so as to encapsulate the metal strip segment between the bag and the segment of sealing tape so as to seal the metal strip segment from contamination.

Further objects of the present invention are provided in a rotary vacuum switch connection apparatus for use with a conveyor movable along an endless path and having a plurality of evacuated components spaced along the conveyor so as to be carried thereby, the conveyor having an outer side, comprising:
- vacuum fittings at each evacuated component including means for connection to one end of a flexible vacuum line;
- rotating evacuated turret means having a plurality of fittings thereat with means for connection to the second ends of a plurality of resilient vacuum lines; and
- a plurality of resilient vacuum lines attached between the fittings of the evacuated turret and of the plurality of spaced-apart evacuated components; and
- means for rotatably displacing the turret means in synchronization with the movement of the evacuated components along the endless path.

BRIEF DESCRIPTION OF THE DRAWINGS

In the drawings, wherein like elements are referenced alike,

FIG. 1 is a plan view of a reclosable container illustrating aspects of the present invention;

FIG. 2 is a fragmentary cross-sectional view taken along the line 2—2 of FIG. 1;

FIGS. 3 and 4 show a sequence of steps to open the bag of the preceding figures;

FIG. 5 is a perspective view showing contents of an opened bag being discharged therefrom;

FIGS. 6—8 show a sequence of operation to reclose the opened bag of FIG. 5;

FIG. 9 is a plan view of a webbing of empty bags of the type shown in the preceding figures, joined end-to-end for the automated processing thereof;

FIG. 10 is a side elevational view of an apparatus for forming the bag of the preceding figures;

FIG. 12 is a fragmentary portion of FIG. 10 taken on an enlarged scale;

FIG. 13 is a cross-sectional view taken along the line 13—13 of FIG. 31;

FIG. 14 is a fragmentary perspective view of the conveyor chain of FIGS. 10-12;

FIG. 15 is a side elevational view of a portion of the apparatus of FIGS. 10-12, illustrating apparatus for forming a sealing tape subassembly;

FIG. 16 is a fragmentary cross-sectional view taken along the line 16—16 of FIG. 15;

FIG. 17 is an exploded fragmentary perspective view of metal tape segments formed by the apparatus of FIG. 15;

FIGS. 18 and 19 show a sequence of severing a continuous sealing tape so as to form a reclosing sealing tape subassembly;

FIG. 20 is a cross-sectional view taken along the line 20—20 of FIG. 15;

FIG. 21 is an exploded perspective view of a portion of the apparatus of FIG. 15 from which the cross-sectional view 20—20 is taken;

FIG. 22 is a fragmentary view showing the apparatus of FIG. 15 in a second operating position whereat the sealing tape subassembly is applied to a flexible bag;

FIG. 23 is a cross-sectional view taken along the line 23—23 of FIG. 22;

FIG. 24 is a perspective view showing the traveling arm of FIG. 22 being raised away from a flexible bag after bonding a reclosing sealing tape subassembly thereto;

FIG. 25 is a fragmentary perspective view showing a cutoff blade and anvil located at a downstream portion of the apparatus of FIGS. 11-12;

FIG. 26 is a side elevational view of the arrangement of FIG. 25;

FIG. 27 is a front elevational view of the arrangement of FIGS. 25 and 26, shown in a lowered operating position so as to sever a reclosable bag from a continuous webbing of bag lengths;

FIG. 28 is a perspective view of a vacuum clamping bar;

FIG. 29 is a side elevational view of the clamping bar of FIG. 28;

FIG. 30 is a cross-sectional view taken along the line 30—30 of FIG. 28;

FIG. 31 is a fragmentary elevational view of a rotating vacuum distributor, shown partly in cross-section, taken along the line 31—31 of FIG. 11;

FIG. 32 is a fragmentary cross-sectional view taken along the line 32—32 of FIG. 31; and FIG. 33 is a schematic diagram of a control circuit for controlling and synchronizing the apparatus of the preceding figures.

DETAILED DESCRIPTION OF THE PREFERRED EMBODIMENT

Figure 11:
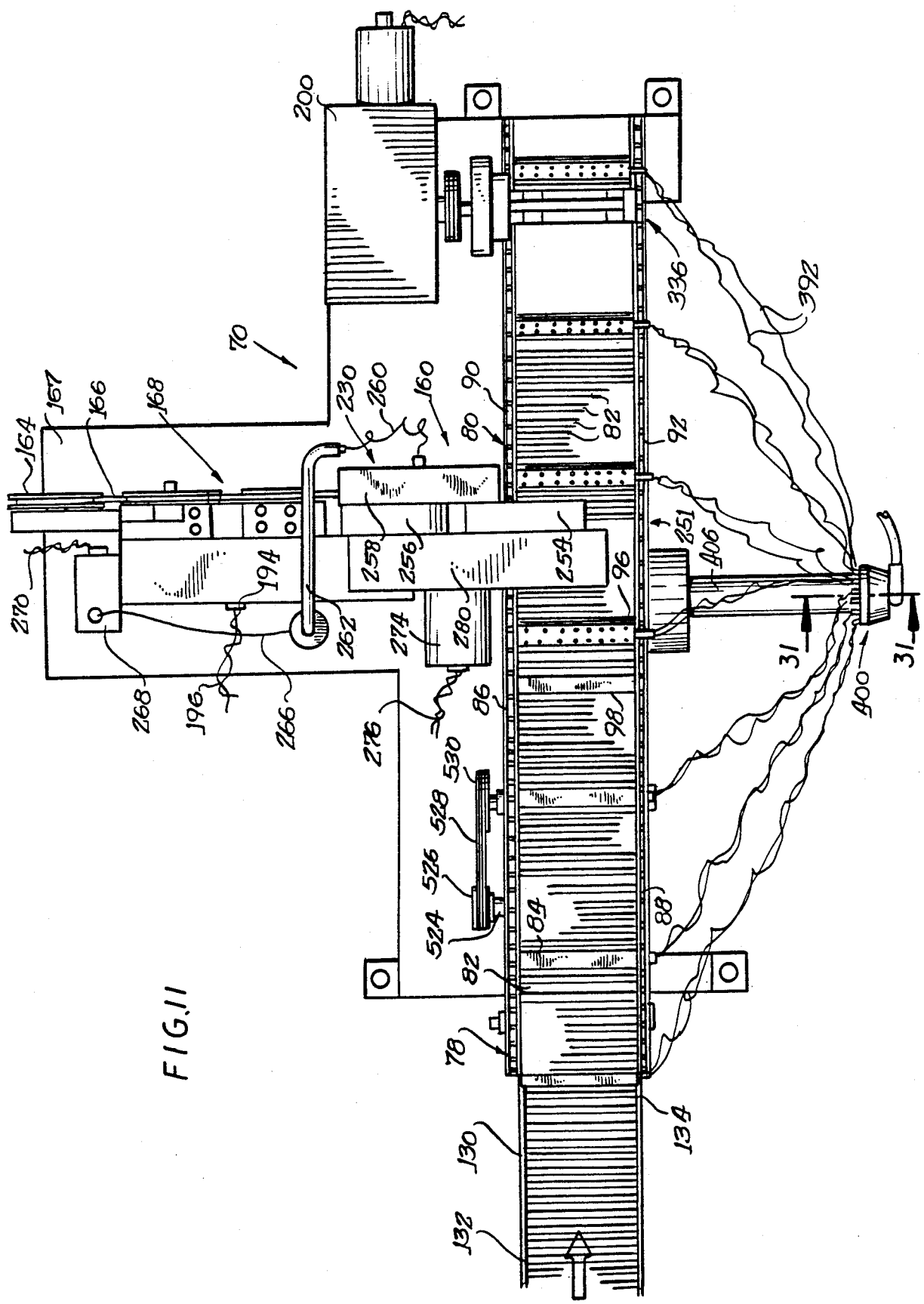
FIG. 11 is a top plan view of the apparatus of FIG. 10.

Referring now to the drawings, and initially to FIGS. 1-9, a reclosable bag is generally indicated at 10. The bag 10 is preferably formed of a flexible material such as plastic, and includes a front wall 12 and a rear wall 14. Bag 10 of the preferred embodiment further includes a peripheral margin, generally indicated at 16, joining the front and rear walls together, preferably using heat sealing techniques. Margin 16 is generally U-shaped, having lateral sides 18, 20 and a bottom side 22.

The front and rear walls 12, 14 may be formed as separate, overlying sheets joined together by heat sealing or the like at the peripheral margin 16. Alternatively, the front and rear walls 12, 14 can be formed as a single sheet folded in half along one side margin 18 or 20, the opposing free ends of the sheet joined together at the other side margin and at the bottom margin. As yet another alternative, the front and rear walls 12, 14 and the material for the peripheral margin 16 can come from a tubular blank of appropriate dimensions.

The front and rear walls together define an internal cavity 24 (see FIG. 5) for receiving any suitable product, such as the cheese shreds 26 illustrated in FIGS. 1 and 5. The upper end 28 of bag 10 is sealed at a top margin 30, using heat sealing or the like techniques. With the completion of the upper seal 30, cavity 24 is completely enclosed by bag 10 so as to maintain a desired condition of the product contained therein. If desired, an aperture 32 may be formed in upper seal 30 to provide a convenient mounting for bag 10 on a display rack. Aperture 32 does not cooperate in opening bag 10.

The peripheral margin 16, especially the lateral sides 18, 20 thereof have a preselected width with a first edge adjacent the internal cavity 24 and a second outer free edge. The lateral side 18 of margin 16 has an inside edge 18b adjacent cavity 24 and an outside free edge 18a. Similarly, the other lateral side of margin 16 has an outer free edge 20a and an inner edge 20b adjacent cavity 24.

According to one aspect of the present invention, bag 10 is opened by tearing walls 12, 14 laterally, from one marginal side to another, along an imaginary tear line 34. According to one aspect of the present invention, there is no line of weakness in walls 12, 14 along the tear line. Tearing is initiated at a slit or notch 36 formed in a portion of the side margin 20, extending inwardly from the outer free edge 20a thereof. A similar notch can be formed in the other side margin 18, if desired. The notches are formed along extensions of the tear line 34. As illustrated in FIG. 3, a user grasps the upper end of side margin 20 in one hand and the upper seal 30, and proceeds to tear the upper seal away from the remaining portion of bag 10, leaving the cutout notch 36 as both a starting point and an indicator for the direction of tear.

According to another aspect of the present invention, the tearing of the front and rear walls 12, 14 is controlled by a segment of tape 40 so as to prevent the tearing from wandering into the major portion of the walls. Tape 40 is applied to wall 12 with an adhesive coating, and is positioned so as to have one lateral edge 40a aligned along the imaginary tear line 34. Upon initiating tearing of walls 12, 14, the line of tearing is prevented from wandering since the tear line is developed along the upper lateral edge 40a of tape 40, thus preventing migration of the tearing in the direction of bottom margin 22. As illustrated in FIG. 4, the top seal 30 is formed with a relatively straight torn edge 30a.

As can be seen from the above, tape 40 functions as a reinforcing tape, strengthening the walls of the bag immediately adjacent the tear line. As will be seen, the tape 40 has a second function of sealing a reclosable member.

In accordance with a further aspect of the present invention, bag 10 is provided with a reopenable seal for reclosing the bag upon a partial discharge of the contents thereof. A reclosing seal assembly, generally indicated at 44, is attached to wall 12 at the upper end thereof, and is employed in a manner to be described herein to reclose bag 10 after the upper seal 30 has been separated therefrom. The reclosing assembly 44 includes a metal segment 48 formed from a flat metal strip made of any suitable material, preferably 3003 aluminum alloy having an H32 hardness.

The metal segment 48 is preferably secured to wall 12 by tape 40. As indicated in the cross-sectional view of FIG. 2, tape 40 completely encapsulates or seals metal strip 48, and thus plays a second role in the preferred embodiment, that of a sealing tape. If desired, separate tapes may be provided, one for reinforcement along the tear line 34 and the other for sealing the metal segment 48. However, tape 40 of the preferred embodiment serves both functions, and is preferably made from an air and moisture-impermeable material such as plastic, having sufficient strength and rigidity to provide the necessary reinforcement at its upper guide edge 40a, so as to prevent the tear line from wandering into the bag walls.

The metal segment 48 preferably has rounded ends 50, 52 to maintain the encapsulation thereof, even as the bag 10 is flexed. According to one aspect of the present invention, the ends 50, 52 are positioned within the lateral sides 18, 20 of the marginal seal 16. End 52 is positioned intermediate the edges 20a, 20b of side seal 20 and the opposite end 50 of the metal segment is positioned intermediate the edges 18a, 18b of the other lateral seal 18. As will be appreciated by those skilled in the art, the marginal side seals 18, 20 when formed by heat-sealing methods are substantially reinforced over one or even a combination of both walls 12, 14.

The rounded ends, in combination with the heat-sealed margins provide a puncture resistant bag 10. As will be seen, the metal segment 48 is bent over upon itself upon a reclosing operation and, due to the curvature of bending, the ends 50, 52 might cut through the sealing tape 40 or the walls 12, 14. Also, a plurality of bags 10 might be loosely packed within a common container, and it is possible that an end of a metal strip will repeatedly travel back and forth across a sidewall of an adjacent bag. The rounded ends of the metal segments and their encapsulation in tape 40 eliminate the risk of puncture of adjacent loosely packed bags due to vibration during shipping.

Referring now to FIGS. 5-8, after tearing the upper seal 30 from the remaining portion of bag 10, an opening 58 is created at the upper end of the bag, which allows the contents stored in cavity 24 to be discharged therefrom. For example, FIG. 5 illustrates a user shaking cheese shreds 26 from bag 10. Many food products quickly deteriorate in the presence of air. Accordingly, it is frequently desirable to expel as much air as possible from cavity 14 immediately prior to reclosing bag 10. As illustrated in FIG. 6, the upper portion 60 of the bag 10, now devoid of contents, has been flattened so as to expel air trapped therein, as indicated by arrows 62. The flattened portion 60 is then folded over upon reclosing assembly 44 and rolling is continued until the rolled end 66 is formed (see FIG. 7). Thereafter, the metal segment 48 located within the inner windings of rolled end 66 has the ends thereof bent over in the manner illustrated in FIG. 8, to prevent unraveling of the rolled end 66. It has been found that the rolled closure illustrated in FIG. 8 is satisfactory to prevent the introduction of air within the remaining portion of the enclosed cavity 24 and to prevent a loss of any fluid that may be present in the cavity.

The bag constructed according to the present invention is particularly suitable for use with automatic forming, filling and sealing equipment, such as that described in U.S. Pat. No. 4,355,494. Preferably, the bags 10 are formed from an end-to-end serial succession of bag blanks which are filled one at a time, without severing the webbing of bag blanks. The cavities 14 of respective bags 10 are filled sequentially and, using heat sealing techniques, the upper seal 30 is formed. The top seal 30 of the filled bag is formed almost simultaneously with the lower margin 22 of an adjacent upstream, empty bag. Thus, a chain or webbing of filled bags 10, formed end-to-end, is presented to machinery for the further automated fabrication of individual filled bags having the reclosing assembly 44, as described above. The bag blanks illustrated in FIG. 9 are devoid of reclosing subassemblies 44, which are applied after the bags are filled in the manner which will now be described.

Referring now to FIGS. 10-27, apparatus is generally indicated at 70 for processing a webbing or bag chain 72 of a plurality of bags 10 which are filled with a product and which are joined end-to-end in the manner described above with reference to FIG. 9. The bag chain 72 is fed from form filling and sealing equipment or a storage location into apparatus 70 with the orientation indicated by the arrow 74 of FIG. 9, wherein the upstream portion of the bag comprises its bottom margin 22 and the downstream portion of the bag comprises its top seal 30. Accordingly, the bags are inserted with their bottom ends first, into the leading end of apparatus 70, between a pair of endless conveyor belts 78, 80. The upper conveyor belt 78 has a substantially shorter length, while the lower conveyor belt 80 extends along substantially the entire length of apparatus 70. The upper conveyor belt 78 comprises an endless chain of rollers 82 and a spaced plurality of pressure bars 84. The rollers 82 and pressure bars 84 rotate about their longitudinal axes, being rotatably supported at each end by a pair of opposed linked chains 86, 88.

The lower conveyor belt 80 also includes a plurality of rollers 82 rotatably mounted at the ends to link chains 90, 92. Spaced about the lower conveyor 80 are pairs of vacuum clamping bars 96 and slotted anvils 98. With reference to the side elevational view of FIG. 10, the conveyor belts 78, 80 are synchronized such that the vacuum clamping bars 96 are aligned with the pressure bars 84. In the preferred embodiment, the free end faces 104, 106 of the pressure bars 84 and vacuum clamping bars 96 respectively, are both flat and have similar dimensions. The spacing between the conveyor belts 78, 80 is maintained such that the free end faces 104, 106 are pressed together with a specified minimum pressure so as to compress, flatten and clamp the portions of the chain 72 intermediate the filled cavities of adjacent bags.

According to one aspect of the present invention, the free end face 104 of pressure bar 84 is comprised of a white sanitary neoprene having a 40 to 60 durometer hardness. The free end face 106 of vacuum clamping bar 96 is also covered with the same neoprene material. The thickness of the heat-sealed portions between adjacent bag cavities is well controlled during the heat sealing process. Accordingly, the spacing between the conveyors 78, 80 can be accurately maintained such that the neoprene facing 104, 106 of bars 84, 96 is compressed a specified minimum amount when the bags are clamped therebetween.

Referring now to FIG. 12, the arrows 108, 109 indicate the direction of rotation of the mating bars 84, 96. The faces 104, 106 initially engage the bag chain 72 along lines of contact formed at the leading corners or edges 104a, 106a. With continued rotation of the conveyor belts 78, 80, the initial line contact grows into a contact surface area, the area increasing in size until the faces 104, 106 are fully mated. With the preferred resilient construction, faces 104, 106 are deformed so as to roll that portion of bag chain 72 extending between the filled cavities of adjacent bags 10. In this manner, any wrinkles or irregularities in that intermediate portion of the bag chain are rolled out and the area is pressed flat, in preparation of the application of the reclosing assembly 44 thereto.

As will be seen, it is important that the portion of bag 10 to which the reclosing assembly 44 is applied be made flat and wrinkle free at this portion of the process, since no other provision is made in the preferred embodiment for preparing the bag for the stamping operation in which the reclosable assembly 44 is applied thereto. It is important, therefore, that the opposed faces 104, 106 of bars 84, 96 be at least as large as the sealing tape 40 of the reclosing assembly and that the faces 104, 106 flatten bag 10 at the precise location where the reclosing assembly and particularly the tape 40 thereof is applied to one wall of the bag.

According to one feature of the present invention, the contents of bag 10 are prevented from entering the upper portion of cavity 24, where the reclosing assembly is to be applied, the walls 12, 14 being in intimate contact with each other when the reclosing assembly is applied thereto, as illustrated in FIG. 2. Accordingly, it is also important that the portion of wall 14 underlying the reclosing assembly also be maintained free of wrinkles or the like surface disruptions. If, for example, the contents are freely flowing under the force of gravity, the apparatus 70 may be inclined to a higher position at its upstream end. To further assist in the shifting of products from the area of bag 10 to which the reclosing assembly 44 is to be applied, a guide track 130 (see FIG. 11) is curved such that its end 132 is positioned substantially higher than its other, opposed end 134 positioned immediately adjacent the conveyors 78, 80. Although not illustrated in FIG. 10, the guide track 130 orients the bag chain 72 in a manner indicated in FIG. 10. Other techniques can also be employed to ensure the proper intimate compression, rolling and flattening of the portion of walls 12, 14 where the reclosing assembly is to be applied.

According to another aspect of the present invention, the free end faces 104, 106 of mated bars 84, 96 are elevated above the nearly continuous surfaces formed by the closely spaced rollers 82 of the conveyor belts 78, 80 (see FIG. 11). With reference to the left-hand portion of FIG. 10, a cavity 110 is thereby formed between opposing portions of the conveyor belts 78, 80. The filled cavities of bags 10 are compressed within cavity 110 by the opposing arrays of rollers 82 in the conveyor belts 78, 80. Upon exiting cavity 110, the filled cavities have a uniform configuration. The leading end of apparatus 70 therefore functions as a package-forming and preparation station, whereat the cross-sectional configurations of the bag is rendered uniform and the portions of the bag between filled cavities are prepared for the subsequent application of a reclosure subassembly.

Referring to FIGS. 14 and 28–30, the vacuum clamp bar 96 includes a hollow body 114 having end walls 116. Mounting studs 118 protrude from the end walls 116 for rotatable mounting to the links of chains 90, 92. In addition, a stub-like vacuum connection 120 protrudes from an end wall of body 114 and communicates with the hollow interior thereof. A plurality of apertures 124 are formed in the neoprene covering 106. The apertures communicate with the hollow interior of body 114 so as to communicate with the vacuum connection 120. As will be seen, each vacuum clamp bar 96 has its own vacuum connection which can be switched on and off as desired.

Referring now to FIG. 28, hollow body 114 has a recessed upper surface 134 dimensioned to receive the lower portion of a resilient pad 136, formed of the above-mentioned neoprene material and having an upper surface comprising the aforementioned free end face 106. An adhesive coating 138 is applied at the bottom of pad 136 and forms a vacuum-tight adhesive bond with the upper surface 134. A channel 142 extends the length of pressure bar 96, between end wall 116 and an opposed end wall 144. Channel 142 is terminated at a threaded connection 148 formed in end wall 116. The vacuum connection 120 preferably comprises a hollow cylinder having a threaded end mating with the threaded bore of connection 148.

A series of recesses 152 are formed in upper surface 134 and extend to channel 142. When applied to upper surface 134, the adhesively bonded pad 136 forms a vacuum-tight seal about the periphery of recesses 152, thereby forming an individual vacuum passageway for each recess, communicating with the common channel 142. The pad 136 is perforated with the aforementioned apertures 124 each of which are aligned with a respective recess 152. Accordingly, each aperture 124 has a separate vacuum passageway cooperating therewith to provide a balanced vacuum level across the length of the pressure bar 96. If desired, the recesses 152 adjacent the connection 148 can be made slightly smaller to adjust the balance in the vacuum level at the apertures located adjacent the connection. However, since the vacuum bars of the preferred embodiment are relatively short (approximately 6 inches in length) no grading or graduation of the recess sizes has been found to be necessary. Other arrangements for providing individual porting of each aperture 24 are possible, and are contemplated by the present invention. For example, the apertures 24 can have different bore sizes.

As mentioned above, care is taken to roll and flatten the portion of walls 12, 14 adjacent the reclosing assembly 44. The lower pressure bar 96 applies a vacuum to the overlying portion of the walls 12, 14 sufficient to insure that the walls maintain the desired flattened configuration after the upper pressure bar 84 is removed therefrom, and the bag continues its travel toward the station 160 whereat the reclosable assembly 44 is applied.

Referring now to FIGS. 15–24, apparatus for forming the reclosing assembly 44 and for applying the reclosing assembly to the chain of bags 10 will be described. Referring especially to FIG. 15, a roll 164 of a metallic strip 166 is positioned at one end of a reclosure subassembly fabrication station 167, upstream of a tape drive assembly 168 and a punch apparatus 187 for punching the metal strip 166 into segments 48 and for bonding the segments to the tape 40. Assembly 168 includes a pair of straightening or finishing rollers 172, 174 disposed between guide blocks 176, 178. The rollers 172, 174 preferably have outer rigid surfaces separating a predetermined amount corresponding generally to the desired thickness of the metallic strip 166, so as to perform a finishing thereof.

Feed rollers 180, 182 drive the metallic strip 166 through assembly 168, and preferably have an outer surface coated with a slip-resistant material such as a soft rubber. A predetermined portion of metallic strip 166 is fed past feed rollers 180, 182 such that the leading end of the metallic strip is received in a second pair of feed rollers 184, 186. After the desired length of metallic strip has been fed to rollers 184, 186, the metallic strip is severed at a punch apparatus 187, including a punch 188 reciprocally driven by a motor-driven crank arm 190. Crank arm 190 is driven by the output shaft 192 of a motor 194 electrically connected through wires 196 to a central control panel, such as the control panel 200 of FIG. 11. The electrical connection 196 between the control panel 200 and motor 194 is schematically illustrated in FIG. 33, as will be described herein in greater detail.

The moving punch 188 cooperates with a stationary anvil or die 204 to remove a portion 206 of metal strip 166. Referring now to FIG. 17, the portion 206 removed by the punch and die is illustrated in FIG. 17 and results in the formation of a rounded end 50 of a downstream segment 48 and a rounded end formed at the leading end of metal strip 166. Upon a second consecutive punching operation the leading end of metal strip 166 becomes the first end 52 of a completed metal segment 48. The punched portions 206 are retained in a suitable receptacle contained within a lower housing 208 of assembly 168.

Referring again to FIG. 15, a bulk supply of sealing tape 40 is stored on a reel 210 and the leading end of the reel is fed across feed roller 184 which forms an initial mating between tape 40 and the leading portion of metallic strip 166 which will, upon a subsequent punching operation, become a completed metal segment 48. Referring to FIG. 16, the lower drive roller 186 is substantially narrower than the upper feed roller 184. The upper feed roller 184 has a width greater than the width of tape 40 so as to accommodate a pair of guide ridges 214 which maintain the desired alignment of tape 40 on feed roller 184. The lower feed roller 186 has a width corresponding generally to the width of the metallic strip 166, and of the metallic segment 48 punched therefrom. As illustrated in FIG. 16 it is generally preferred that the laterally outer portions 216 of tape 40 overhanging the lower feed roller 186 remain unsupported so as to avoid contact with the lower adhesive-bearing surface of tape 40.

After exiting the feed rollers 184, 186, tape 40 and the metallic segment 48 enter a guide 220 and thereafter pass through a pair of finishing rollers 222, 224. Unlike the feed rollers 184, 186 which have a soft nonslip outer surface, the finishing rollers 222, 224 are preferably formed of a suitable metal such as stainless steel and have rigid incompressible outer surfaces as was mentioned above with respect to the finishing rollers 172, 174. The upper and lower finishing rollers 222, 224 have the same relative proportions as the rollers 184, 186 illustrated in FIG. 16, with the lower finishing roller 224 being narrower, having a width corresponding to that of the metal segment 48, while the upper finishing roller 222 has a greater width corresponding to that of tape 40. Finishing rollers 222, 224 are spaced a predetermined distance apart so as to apply a pressure to tape 40 sufficient to bond the tape to metal segment 48. The adhesively coated tape 40 is rolled onto the metal segment 48 so as to drive out any air pockets or irregularities and so as to form a suitable watertight, airtight bond with a metal segment 48.

Although the metal strip is discontinuous, the portion 206 having been removed therefrom by punching, the tape 40 bonded to metal segment 48, as thus far described, is continuous with the bulk supply of tape on reel 210. The feed roller 184 and the finishing rollers 222, 224 cooperate to advance the bonded joinder of tape 40 and metal segment 48 toward a downstream guide 228 and a transfer arm loading station generally indicated at 230. In order to avoid contact between the lower finishing roller 224 and the adhesively coated lower surface of tape 40, finishing roller 224 is notched at 232, the notches having dimensions corresponding to the punched portion 206 and being synchronized therewith as the metal segments are advanced past the finishing rollers.

Referring additionally to FIG. 21, a guide track 234 receives the bonded joinder of tape 40 and metal segment 48. Guide track 234 includes a raised center section 236 having the same approximate width as the metal segment 48. Side walls 238 guide the edges of tape 40. As seen most clearly in the cross-sectional view of FIG. 20, the horizontal surfaces 242 are maintained out of contact with the lower adhesive surface 41 of tape 40.

The bonded joinder of tape 40 and metal segment 48 are advanced along guide track 234 until the leading edge of tape 40 is aligned adjacent to the end 246 of guide track 234. Guide track 234 is dimensioned so that the end wall 248 at its opposed end is located at the desired downstream end of tape 40, spaced apart from the downstream end 50 of metal segment 48. That is, the length of guide track 234 is approximately equal to the length of the segment of tape 40 applied to bag 10.

A transfer arm generally indicated at 250 is mounted for movement between a loading position at loading station 230 (as illustrated in FIG. 15) and a second, stamping position at a reclosure application station 251 (as indicated in FIG. 22) whereat the reclosable assembly 44 is applied to a bag 10. The transfer arm 250 includes a framework 252 having an upper portion with ends pivotally mounted to arms 254, 256. A vacuum head 258 is fixably mounted at the lower end of framework 252. Vacuum head 258 includes a resilient vacuum connection 260 preferably comprising a flexible coiled hose, connected at its remote end to a rigid pipe 262. Pipe 262 is connected through a vacuum line 266 to a vacuum switch 268 (see FIG. 11). Vacuum switch 268 is preferably operated by a solenoid connected through conductors 270 to the control panel 200. The connection of conductor 270 to the control panel 200 is illustrated in schematic form in FIG. 33.

The arm 254 is driven by an electric motor 274 connected to control panel 200 through conductors 276, which are also illustrated in schematic form in FIG. 33. As motor 274 is operated, the transfer arm 50 is swung in arcuate path, back and forth between the first and second positions illustrated in FIGS. 15 and 22. Arm 254 is connected at one end to the shaft 278, driven by a chain drive within housing 280.

Referring now to FIGS. 15, 18 and 19, the end 284 of vacuum head 258 includes a rounded guide surface 286. When the transfer arm is in the loading position of FIG. 15, the rounded guide surface 286 is brought into contact with an insert plate 286 forming the downstream end of guide 228 as illustrated in FIG. 19. Insert 286 is positioned immediately above a gap or opening 288 through which tape 40 and the metal segment 48 are passed. A second, lower insert 290 has an outer face coplanar aligned with the upper insert 286, and is positioned below the gap 288. A knife blade 294 is carried on a reciprocating solenoid 296, energized by conductors 298 which are connected to control panel 200, as illustrated in schematic form in FIG. 33.

Referring now to FIGS. 18 and 19, after the metal segment 48 and the leading end of the tape 40 stored on reel 210 have been advanced into guide track 238, in preparation of a transfer operation, the transfer arm is rotated to the transfer position of FIG. 15 with the vacuum head 258 overlying tape 40 and metal segment 248, in abutting relationship with the insert 286. With the working face 308 of vacuum head 258 backing the upper, uncoated major surface of tape 40, the solenoid 296 is actuated, driving knife blade 294 in an upward direction toward the coated surface 41 of tape 40 so as to sever tape 40, thus forming the tape segment to be bonded to bag 10. Vacuum head 258 applies a substantial pressure to tape 40 and segment 248, clamping the tape and segment against the center section 236 of the guide track.

As indicated by the shade lines in FIG. 21, and as illustrated in the side elevational view of FIG. 18, the edge of knife blade 294 camming against the curved surface 286 of the vacuum head is beveled so as to present an enlarged camming surface 295 which follows the curved end 286 of the vacuum head as illustrated in FIG. 19. With this deflection of knife blade 294, exaggerated in the drawings for purpose of illustration, a tension is applied to the segment of tape 40 overlying metal segment 48, thus improving the severance thereof from the bulk supply of the tape stored on reel 210.

Upon severing the segment of tape 40 from the bulk supply, a completed reclosing assembly 44 is formed with an outer margin of tape 40 overlying all sides of metal segment 48, in preparation for the complete encapsulation without further preparation, and with only a simple stamping motion where the reclosing assembly is stamped against the flattened portion of bag 10. The vacuum switch 268 is operated so as to apply a vacuum through flexible connector 260 and a hollow interior of a vacuum head (see FIGS. 20 and 23) to tape 40. Referring now to FIGS. 20 and 23, vacuum head 258 includes a hollow body 300 defining an interior chamber 302. A plurality of apertures 304 extend from cavity 302 to a working face 308. By operating the vacuum switch in response to a signal from electrical conductors 270, a vacuum is applied to the interior cavity 302 and through the plurality of apertures 304 to the working face 308 which is in compressive engagement with at least the central portion of tape 40 overlying the metal segment 48. Upon the application of a vacuum signal to head 258, any remaining portions of tape 40 are brought into intimate contact with working face 308, in preparation for a transfer operation. Preferably, the vacuum is applied to the working face 308 shortly after the vacuum head is brought into engagement with tape 40, the position illustrated in FIGS. 15 and 19.

Thereafter, with a signal applied to electrical conductors 276, the motor 274 is energized, driving arm 254 toward conveyor belt 80. With reference to FIG. 15, the rotation of arm 254 is moved in the direction of arrow 312. This causes one upper corner of frame 252 to be swung in an arcuate path following the pivotal displacement of arm 254. The opposite upper corner of frame 252 pivotally fixed to the other arm 256, and follows a substantially identical arcuate path. As a result, the vacuum head 258 is maintained in a constant direction and is preferably not tilted while traveling between its two, loading and stamping positions.

The vacuum line 160 supplying vacuum to the head 258, as mentioned above, is flexible, and is preferably coiled so as to have a stored length sufficient to maintain an integral vacuum-tight contact throughout the range of motion of head 258. Accordingly, a vacuum signal is continuously applied to head 258, as the head carries the severed tape 40 which attached by the vacuum applied thereto. The metal segment, adhesively bonded to tape 40, is also carried by head 258 as the head is moved between the loading and stamping positions of FIGS. 15 and 22, respectively.

Referring to FIG. 22, it is generally preferred that the upper surface of conveyor belt 80, the surface carrying the bag 72, is generally parallel, i.e. coplanar, to the upper surface of the central guide section 236. The linkage that mounts head 258 accommodates a difference in elevation between guide track 234 and the upper surface of conveyor belt 80. As mentioned above, the working surface of vacuum head 258 is continuously maintained in parallel positions, hence the preference for maintaining the conveyor belt and guide track in parallel orientation. It is important, especially for an efficient stamping operation, that the two parts stamped together be aligned in this manner.

As mentioned above, the pad 136 of the vacuum clamp bar 96 is resilient and can withstand either local or overall compressive distortion while maintaining a vacuum at each of its apertures 124. As will now be seen, this feature of the clamp bar 96 is important in attaining an intimate bond between tape 40 and the side wall of bag 10, in a fast-moving automated environment. Referring to FIGS. 20 and 23, the vacuum head 258 through its vacuum attachment to tape 40, carries the recently-formed reclosing assembly 44, which consists of a cut length of tape 40 and metal segment 48 toward conveyor belt 80.

Referring now to FIG. 23, and additionally to FIGS. 10 and 12, vacuum head 258 is displaced in an arcuate direction. When viewed in an end view, the path of head 258 appears to be directed vertically downward, in the direction of arrow 316. Referring briefly to FIG. 12, the bag chain 72 is oriented such that the top seal portion 30 of a bag 10 is clamped by vacuum, free of wrinkles and surface disruptions over a bar 96. Immediately downstream of upper seal 30 is a bottom seal 22 of an adjacent bag 10. Referring now to FIG. 10, most of the bag chain 72 has been omitted for purposes of clarity. FIG. 10 illustrates a relative position of conveyor belt 80 and transfer arm 250 at the reclosure application station 1251, at a point in time when the reclosing assembly 44 is being applied to a bag 10. As indicated in FIG. 1, the vacuum head 258 overlies the vacuum bar 96 and is in contact therewith. FIG. 23 shows this application of the reclosing assembly to an upwardly facing wall 12 of a bag in greater detail, illustrating the initial stages of a stamping operation wherein a reclosing assembly 44 is applied to the upper end of a bag. As will be appreciated upon a review of the cross-sectional illustrations of FIGS. 20 and 23, the underside, adhesively coated surface 41 of tape 40 is held away from wall 12 of the bag, due to the thickness of the metal segment 48. According to one feature of the present invention, the downward pressure on the reclosing assembly during a stamping operation is sufficient to deform the central longitudinal portion of resilient pad 136, allowing the adhesively coated surface 41 of tape 40 to form an intimate bond with the exposed, upper surface of wall 12 to achieve the desired close-fitting encapsulation of metal segment 48, as illustrated in FIG. 2.

If desired, the working face 308 of vacuum head 258 can be constructed in a manner substantially identical to that of vacuum bar 96 wherein a resilient pad similar to pad 36 is inset within the downwardly facing end wall 320 of head 258. But for the outside external configuration of body 300, vacuum head 258 would, in cross-section, resemble a mirror image of the cross-section of the vacuum clamping bar 96. The inclusion of a resilient pad in head 258 may allow a smaller radius bend 324 where tape 40 overlies the upper corner of metal segment 348 (see FIG. 2). If desired, however, the resilient pad can be omitted from the vacuum head, since intimate engagement between the adhesively coated surface of tape 40 and wall 12 can be made possible by the compressible resilient pad 36 of the vacuum clamping bar 96 which, as can now be appreciated, functions as a backup or anvil during the stamping operation.

As described above, the application of a reclosing assembly 44 to bag 12 is accomplished with a stamping operation. The stamping motion for applying the reclosing assembly to the bag was chosen, in part, because of the high speed afforded by that type of movement, compared to a rolling movement, for example, wherein tape 40 is rolled onto a bag 10. The stamping operation according to the above-described aspects of the present invention has been found to consistently provide intimate, void-free engagement of tape 40 throughout all portions thereof surrounding the metal segment 48, thus providing a contamination-free encapsulation of the metal segment, and eliminating any voids or interstices where bacteria or the like contamination can reside.

Referring now to FIG. 24, the end 330 of vacuum head 258 remote from guide surface 286 preferably carries a slitting or notching blade 328 mounted by a block 332. The conveyor 80 and transfer arm 250 are spaced apart from each other a precise amount so as to align the edges of reclosing assembly 44 with the edges 18a and 20a of bag 10. Blade 328 forms the notch or slit 36 during the stamping operation. As will be appreciated by those skilled in the art, the cutting or slitting operation can be formed in a different step, for example, at an additional station downstream of the station where the stamping application of the reclosing assembly takes place. However, by mounting the blade 328 in the manner indicated, a very close tolerance alignment with the edge 40a of tape 40 and with the lateral side seal 20 is quickly and easily achieved in a reliable manner which guarantees continuous accuracy throughout a production run, and which adds little extra demand to the energy necessary for the stamping application of the reclosing assembly.

Referring now to FIGS. 10, 11 and 25-27, the cutoff operation occurs at a severing station 336 where an individual bag 10 is separated from the bag chain 72. The bag chain 72, after having closing assemblies 44 applied to one or more individual bag portions thereof, is advanced toward the cutoff station 336, whereat an individual bag 10, now fully formed, is severed from an adjoining upstream filled bag. Referring to FIG. 10, a slotted anvil 98 is positioned directly under a cutoff blade 340. Referring to FIGS. 14 and 25, the slotted anvil 98 includes a body 342 having an end wall 344 from which a pair of mounting studs 346 extend in an outward direction. Similar mounting lugs extend from an opposing end wall, not visible in the figures. A continuous slot 348 extends the length of body 342 and is dimensioned to receive the cutoff blade 340 therein.

Mounting lugs 346 are pinned to the linked chains 90, 92 in the manner indicated above with respect to the vacuum clamping bar 96. The cutoff blade 340 is mounted in a frame 350 having an outer free end 352 and an inner end 354 joined to a mounting block 356. Mounting block 356 is mounted for vertical reciprocation within a frame 358 by a plurality of guide rollers 360. The mounting frame 358 is joined to the support base 374 which supports apparatus 70. Frame 358 includes guide rails 364 having guide tracks 366 generally wedge-shaped or V-shaped in cross-section, which are received in the recessed outer periphery 368 of rollers 360.

A motor 376 connected to control panel 200 by conductors 378 drives the knife blade 340 in vertically reciprocating directions, as indicated by the arrow 380 of FIG. 26. Motor 376 drives a shaft 384 connected to mounting blade 356 in vertical directions, through an eccentric cam 386 and a crank arm 388. As motor 376 is energized, cutoff blade 340 is driven in a downward direction so as to pass through the portion of the bag 10 located atop slot 348, with the blade 340 entering into the slot, thus separating the top seal 30 of an upstream bag from the bottom seal 22 of an adjacent downstream bag, so as to separate the upstream bag from the bag chain 72. If desired, the vacuum signal can remain applied to the vacuum clamping bar located immediately upstream of the slotted anvil 98, whereat the cutting operation is performed. The vacuum clamping with the separated bag can be continued when the bag reaches the desired location. For example, a chute can be installed at one end of conveyor belt 80 and upon engagement with the chute, the vacuum clamping can be released, allowing the bag to travel along the chute to a further destination point.

As mentioned above, the vacuum clamping bars 96 each have individual vacuum signals connected thereto through the vacuum connections 120. The vacuum connections are completed through flexible vacuum lines 392, as shown in FIGS. 10 and 11. The remote ends of the vacuum lines are connected to a rotatable vacuum distributor, generally indicated at 400, having a vacuum switch and a distributor. As shown in FIG. 31, the apparatus 400 includes a nonrotatable (but axially displaceable) disk-like valve head 402 having a central bore 404 for receiving a stationary mounting shaft 406. Shaft 406 extends outwardly from a mounting block 410 attached to the supporting frame 374. The valve head 402 has an interior, annular mating face 412. A rotating distributor head 414 has a front face 416 mating with face 412.

A plurality of threaded connections 420 are provided at the rear of the distributor head 414, and the plurality of flexible vacuum lines 392 are connected thereat through threaded connectors 424. The threaded connections 420, 424 are preferably uniformly spaced about the periphery of the rotating distributor head 414. The distributor head 414 is connected to a hollow cylindrical body 440 by a plurality of threaded fasteners 442. Together, the distributor head 414 and hollow cylinder 440 comprise a rotating evacuated turret, generally indicated at 444, which is rotatably supported from the stationary shaft 406 by a ball bearing support 446. A series of internal passageways 450 extend the vacuum connection of flexible lines 392 to the interface between the valve head 402 and the rotating turret 444.

The valve head 402 has a threaded bore 454 for receiving a threaded fastener 456 which is attached to one end of a vacuum line 458. The vacuum line 458 is connected at its other, remote end to a vacuum source. The threaded bore 454 extends to an internal channel 462 and a recess 464 which extends over the center of face 412 of stationary disk 402. Referring now to FIG. 13, a slotted disk 470 is joined to the face 412 of disk 402 by screw fasteners (not shown) or by other suitable means. The disk 470 has an internal bore 474 for receiving the stationary shaft 406. Disk 470 further includes a specially configured slotted opening 476. The distributor head 414 has a recess 478 extending throughout its face 416 which receives disk 470 and a portion of valve stationary disk 402. An outer peripheral collar 480 integrally formed by a recess in rotating disk 414, surrounds the free end of disk 402.

Turret 444 is free to rotate, whereas disk 402 is restrained from rotation by any suitable means, such as a key inserted along the stationary shaft 406. A recess 484 in the outer free end of stationary disk 402 receives a washer 486 which abuts one end of a helical spring 488. A washer 490 abuts the other end of helical spring 488 and the spring is held in compression by a threaded fastener or nut 492, engageable with the threaded end 496 of shaft 406. By adjusting nut 492, the amount of spring pressure applied to stationary disk 402 can be varied. Although stationary disk 402 is restrained from rotation, it is telescopically movable about the fixed shaft 406, in response to the force of spring 488. While the rotating turret 444 is mounted for rotation about shaft 406, it is restrained from axial or telescopic displacement along the length of shaft 406. The axially directed pressure of spring 488, applied to stationary disk 402, is in turn transmitted to the axially or longitudinally immovable, turret 444, thus holding the mating faces 416, 412 in a vacuum-tight engagement. The vacuum-tight seal is further enhanced by the overlapping arrangement of the outer collar 480, enclosing the outer periphery of stationary disk 402.

Referring now to FIG. 10, as conveyor 80 is rotated in the clockwise direction of arrow 500, the vacuum blocks 96 continuously traverse a closed, generally oval circuit. To maintain a continuous vacuum connection with each vacuum clamping bar, and to prevent the flexible vacuum lines 392 from becoming entangled, distributor head 414, which provides a vacuum distribution among the various lines 392, is made to rotate in synchronism with the belt 80. In the preferred embodiment, a synchronization of the movement of distributor head 414 and vacuum blocks 96 is provided by a gear 504 having an internal bore 506 mounted to one end of the hollow body 440. Gear 504 has teeth 508 which engage the links of drive chain 92 of the conveyor belt 80. As the belt 80 traverses its closed circuit, drive chain 92 rotates the hollow tubular body 440 and the distributor head 414 attached thereto.

As will become apparent from studying FIG. 10, the distance between a particular vacuum clamping bar and the apparatus 400 changes as the vacuum clamping bar traverses the circuit of conveyor belt 80, having a minimum distance when adjacent apparatus 400 and a maximum distance when the vacuum clamping bar is at one end of the conveyor 80. Accordingly, the flexible vacuum lines 392 are preferably coiled and have a resilience necessary to tighten the coils so as to shorten the apparent length of the lines as the vacuum clamping bar approaches the apparatus 400. As the conveyor belt 80 traverses its path, gear 504 and the hollow body section 440 rotate so as to cause a rotation of distributor head 414 in synchronism with the conveyor belt, thus preventing an entangling of the vacuum lines 392.

Further, as will be appreciated from studying disk 470 of FIG. 13, a vacuum switching is performed as turret 444 is rotated. As described, the disk 470 is held in a stationary position, while the face 416 of distributor head 414 rotates about the disk 470. The channels 450 are passed over slot 476, bringing the channels 450 into and out of communication with the slot, thereby switching a vacuum signal in flexible vacuum lines 392. For example, the upper vacuum line 392 of FIG. 31 has a passageway 450 aligned with slot 476, so as to apply a vacuum signal thereto. However, the lower vacuum line opposes the solid, lower portion 471 of disk 470, and accordingly, no vacuum signal is applied thereto.

Referring briefly to FIG. 10, the slot 76 of disk 470 is oriented to communicate with the vacuum connections in the upper one-half portion of apparatus 400. The vacuum lines 392 connecting vacuum clamping bars in the upper one-half portion of conveyor 80 receive vacuum signals, while the vacuum clamping bars in the lower one-half of conveyor 80 do not have a vacuum applied thereto. By altering the configuration of slot 476 and/or by adding additional slots, virtually any desired sequence of vacuum switching operations can be achieved as gear 504 is rotated.

In the preferred embodiment, the rotation of gear 504 is associated with the travel of conveyor 80. However, gear 504 or any other suitable connection to hollow shaft 440 can be synchronized with another portion of apparatus 70. Further, disk 470 is maintained nonrotatable, while the distributor head 414 is mounted for rotation. This provides a fixed relationship between the switching of vacuum signals and the orientation of the conveyor belt 80. However, if desired, disk 470 can be associated with the rotating evacuated turret 444 of apparatus 400, which would produce a switching function quite different from that described above.

Referring again to FIG. 10, the conveyor belt 80 is driven by gears 512 which engage the link chains 90, 92 located at either side of the conveyor belt. Gears 512 are, in turn, driven by one or more chains 514 connected to a shaft 516 of a motor 518. Motor 518 is energized by electrical conductors 520 connected to control panel 200 as indicated schematically in FIG. 33. Referring to FIG. 11, shaft 524 connected to gears 512 are also connected to a gear 526. A drive chain 528 connects a gear 530 and shaft 532, which in turn drives the upper conveyor 78 in synchronism with the lower, longer conveyor 80. Thus, the drive of conveyor belts 78, 80 are connected together for synchronized movement.

Turning now to FIG. 33, the control panel 200 contains circuitry for generating output signals to energize various components of apparatus 70 with the required synchronization indicated above. For example, the control circuitry can be housed in a cabinet 200 attached to the supporting framework 374 or installed in a stand-alone cabinet located adjacent apparatus 70. As indicated in FIG. 33, power input connections are made to the circuitry within cabinet 200. Outgoing signals are carried by conductors 520 to motor 518 which drives the conveyor belts 78, 80 with a common synchronized motor drive, the synchronization being provided by the gear and chain arrangement described above, or by other suitable synchronizing means.

As the bag chain 72 enters the mating conveyor belts, the area between adjacent bags is rolled, pressed and flattened in the manner described above, preparatory to the application of a reclosing assembly at the reclosure application station 251. Output signals are applied through conductors 196 to drive motor 194 to energize the tape drive assembly 168. The drive wheels advance proper amounts of the continuous roll of tape 40 and the metallic strip 166 toward the punch 204 located at the reclosure subassembly station 167. Output signals are applied to conductor 166 to activate the punch drive which operates on metallic strip 166 to form the metal segment 48. Thereafter, additional drive signals are applied to conductors 197 to advance the tape 40 and metal segment 48 to guide track 234 located at transfer station 230. Output signals applied to conductors 276 energize motor 274, moving the transfer arm 250 to the loading position, wherein vacuum head 258 contacts the tape 40 and overlies the metal segment 48. Control signals are applied to the cutoff solenoid through conductors 298 to drive the cutting knife 294 in an upward direction, severing a portion of tape 40, thus completing the formation of the reclosing assembly 44. Thereafter, solenoid 296 is de-energized or otherwise operated so as to retract knife 294 in preparation of the transfer of the reclosing subassembly to bag 10.

A vacuum is applied to the vacuum head 258 of the transfer arm in response to control signals applied through conductors 270 to the vacuum switch 268. With a vacuum applied to the reclosing assembly 44, further control signals are applied through conductors 276 to move the transfer arm to the stamping position at the reclosure application station 251, where the reclosing assembly is brought into contact with the chain of filled bags.

After applying the tape 40 of the reclosing assembly to a bag 10 and simultaneously notching or slitting one edge of the bag, control signals are again applied through conductors 276 to retract the transfer arm to the loading position in preparation for another cycle, and clearing the bag chain 72 for advancement along conveyor 80. Thereafter, further signals are applied through conductor 520 to the conveyor belt to advance the bag 10 to the final cutoff station, bringing a slotted anvil 98 into alignment with cutoff blade 340. By energizing the motor drive 376 through conductors 378, the cutoff blade assembly and cutoff blade 340 are lowered, so as to sever the bag 10 from the remainder of bag chain 72. With further energization of the conveyor belt drive through conductors 520, the conveyor is advanced along its closed circuit path.

Vacuum switching, as provided by apparatus 400 in the manner described above with reference to the control disk 470 of FIG. 13, provides the desired synchronization for releasing the completed bag 10 from the conveyor belt, allowing discharge of the bag to a loading chute, for example, for transport to a remote location. Upon further indexing of conveyor 80 through the application of control signals to conductors 520, another bag is presented to the transfer station whereat a reclosing assembly is applied thereto, and simultaneously therewith a completed bag is presented to the cutoff station. If desired, the stamping operation which applies a reclosing assembly to a bag and the cutoff operation, in which cutoff blade 340 is driven in a downward direction, can be performed substantially simultaneously, depending upon the placing of the cutoff assembly from the transfer station.

Although the control panel 20 has been described above as being exclusively electrical in nature, those skilled in the art can readily substitute vacuum or hydraulic controls for the various stations and components of apparatus 70, and such is contemplated by the present invention.

By way of illustration and not of limitation, a commercial embodiment of bag 10 was prepared with a reclosing assembly 44, with the metal segment 48 thereof completely encapsulated by tape segment 40, using the method and apparatus described above. The following dimensions are given to illustrate the amounts of overhanging margin of tape 40 required to completely encapsulate the metal segment 48. The reclosing assembly was applied to a webbing of flexible plastic bags approximately 6 inches in width. The lateral seals 18,20 had a width of approximately 1.30 inches. The metal segment 48 was centered on the bag and had a length chosen so that its free ends 50,52 were spaced approximately ¼ inch from the outside edges 18a,20a of bag 10. The tape 40 had a length corresponding generally to the width of bag 10 and therefore extended between the outer edges 18a,20a thereof. A ¼ inch margin of tape 40 was best provided at the ends 50,52 of metal segment 48. In the preferred embodiment the metal segment 48 was formed from a strip of aluminum alloy No. 3003 which was ¼ inch wide and 0.012 inch in thickness. The width of tape 40 applied to bag 10 was approximately ¾ inch in width, providing a margin of ¼ inch along the longer sides of the metal segment. The plastic material of tape 40 and the adhesive coating thereof are specified by the manufacturer, 3M Corp., with reference to their Part Number 8458, which is commercially available. With the overhanging margins of tape 40 and the type of plastic film and adhesive comprising the tape, a complete void-free encapsulation of metal segment 48 was consistently obtained with a stamping operation which imparted a pressure ranging between 2 and 10 psi to compressively engage the pressure sensitive tape 40 and bag 10. The pressure required for sealing was developed against a backing pad of neoprene having a 40 to 60 durometer hardness. The pressures required to adequately bond tape 40 to bag 10 were easily developed with the apparatus described above, and provided a rapid, advantageous production rate which, based upon trial test, is expected to range between 50 and at least 80, but preferably 100 bags per minute. If further increases in production speed are desired, multiple reclosure fabrication stations, transfer stations and severing stations can be provided on a continuous conveyor belt For example, a separate reclosure fabrication station having tape drive, punch and tape cutting apparatus can be positioned downstream of apparatus illustrated in FIG. 15 and can preferably be spaced apart therefrom by a length corresponding to an integral multiple of the length of bag 10. For example, two subassembly fabrication and transfer stations can be spaced one bag length apart for the simultaneous fabrication and application of a reclosure assembly to two adjacent bags 10 Two severing stations of the type illustrated in FIGS. 25-27 can be provided one bag length apart for the simultaneous severing of two adjacent bags. However, it is expected that the speed of the severing station can be increased to the point where only a single severing station would be required The lower conveyor belt would have to be extended in length to accommodate the additional stations, and the speed of travel and indexing thereof would have to be adjusted accordingly. With the simple addition of extra reclosure fabrication and transfer stations, the rate of production of apparatus 70 can be readily increased two or more times.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A reclosable bag comprising:
    opposing walls having top and bottom edges extending between a pair of side edges;
    a marginal seal of preselected width joining the top, bottom and side edges of said walls to form a product-receiving cavity therebetween, the marginal seal having an inner edge adjacent the cavity and an outer free edge;
    a tear line along said walls between the side edges thereof, located adjacent the marginal seal of said top edge;
    weakening means in the marginal seal of at least one side edge extending from a free edge of the marginal seal and formed along an edge of said tear line;
    a metal strip segment on one side wall having a top edge spaced from the tear line and a pair of opposed ends adjacent each side edge terminating between the inner and outer edge of the marginal seal located thereat; and a strip of sealing tape cooperating with said metal strip segment to encapsulate said metal strip segment, said sealing tape having a top edge adjacent said tear line so as to prevent migration of the tearing of said walls during opening of the reclosable bag into major portions of the walls; and said opposing walls being flexible so as to be rollable about said metal strip segment, and said metal strip segment being bendable so as to reclose the opening in the bag formed by tearing the walls along said tear line, upon rolling the walls about the metal strip segment.

2. The reclosable bag according to claim 1 wherein the ends of said metal strip segment are rounded.

* * * * *

UNITED STATES PATENT AND TRADEMARK OFFICE
CERTIFICATE OF CORRECTION

PATENT NO. : 4,898,280

DATED : February 6, 1990

INVENTOR(S) : Heinz F. Runge

It is certified that error appears in the above-identified patent and that said Letters Patent is hereby corrected as shown below:

On the title page item [56] under the heading entitled "References Cited - U.S. Patent Documents", in reference Patent No. 3,618,850, change the name "Balmer" to read --Palmer--.

On the title page item [57] under the heading entitled "Abstract" change the word "excapsulation" to read the word --encapsulation--.

In Column 6, line 14, after the word "adhesive" delete the semicolon --;--.

In Column 10, line 1, after the numeral "152" delete the period --.--.

In Column 14, line 44, change "downwardlyfacing" to read --downwardly-facing--.

In Column 20, line 20, after the word "belt" insert a period --.--.

In Column 20, line 29, after the numeral "10" insert a period --.--.

UNITED STATES PATENT AND TRADEMARK OFFICE
CERTIFICATE OF CORRECTION

PATENT NO. : 4,898,280

DATED : February 6, 1990

INVENTOR(S) : Heinz F. Runge

It is certified that error appears in the above-identified patent and that said Letters Patent is hereby corrected as shown below:

In column 20, line 34, after the word "required" insert a period --.--.

Signed and Sealed this

Twenty-fifth Day of August, 1992

Attest:

DOUGLAS B. COMER

*Attesting Officer*  *Acting Commissioner of Patents and Trademarks*